US006765594B2

(12) United States Patent
Hautt et al.

(10) Patent No.: US 6,765,594 B2
(45) Date of Patent: Jul. 20, 2004

(54) METHOD AND SYSTEM FOR MANAGING FUNDRAISING CAMPAIGNS

(75) Inventors: William D. Hautt, Alameda, CA (US); Cara D. Hautt, Newburyport, MA (US); Louis M. Bakos, Alameda, CA (US)

(73) Assignee: The Focus Group, LLC, Austin, TX (US)

( * ) Notice: Subject to any disclaimer, the term of this patent is extended or adjusted under 35 U.S.C. 154(b) by 510 days.

(21) Appl. No.: 09/741,768

(22) Filed: Dec. 18, 2000

(65) Prior Publication Data

US 2002/0080175 A1 Jun. 27, 2002

Related U.S. Application Data

(60) Provisional application No. 60/172,502, filed on Dec. 17, 1999.

(51) Int. Cl.[7] .............................................. G06F 15/00
(52) U.S. Cl. ..................................... 345/764; 345/748
(58) Field of Search ............................ 345/762, 763, 345/764, 748; 705/77, 51, 52, 14

(56) References Cited

U.S. PATENT DOCUMENTS

| 5,523,942 A | * | 6/1996 | Tyler et al. .................. 364/401 |
| 6,298,126 B1 | * | 10/2001 | Kawecki et al. ............. 379/126 |
| 6,324,541 B1 | * | 11/2001 | De L'Etraz et al. .......... 707/104 |

OTHER PUBLICATIONS

Dos Manual for Tracker2 Campaign Management System with sample reports, available to customers prior to Dec. 1, 1998.

* cited by examiner

*Primary Examiner*—Cao Kevin Nguyen
(74) *Attorney, Agent, or Firm*—Stephen J. LeBlanc; William D. Hautt; Quine Intellectual Property Law Group, P.C.

(57) ABSTRACT

A system to maximize the effectiveness of managing capital campaigns, annual funds, and fund-raising projects. The invention in one embodiment includes a special software package designed to manage the complexities of campaigns. In specific embodiments, the invention also involves data items and structures, reporting formats and features, and software and/or business methods for effectively managing fundraising campaigns.

27 Claims, 33 Drawing Sheets

SUMMARY PRODUCTION REPORT
Capital Campaign  $10,000,000   12/30/2002
*MASTER STRATEGY*

Page: 1
Date: 01/07/2002

| Caller | # OF PROSPECTS | | | Target Amount | | Asked For Amount | Committed Amount | Total | |
|---|---|---|---|---|---|---|---|---|---|
| | Total | Talked To | Plan To Contact | High | Low | | | High | Low |
| Individual Strategy | | | | | | | | | |
| _Unassigned Caller | 0 | 0 | 0 | $10,000 | $5,000 | $0 | $0 | $10,000 | $5,000 |
| Harriet Able | 5 | 0 | 1 | $50,000 | $18,000 | $0 | $2,510,000 | $2,560,000 | $2,528,000 |
| Jerry Adams | 5 | 1 | 2 | $0 | $0 | $35,000 | $1,020,000 | $1,055,000 | $1,055,000 |
| Annie Barr | 2 | 0 | 0 | $1,300,000 | $250,000 | $0 | $250,000 | $1,550,000 | $500,000 |
| Jim Edwards | 8 | 0 | 5 | $175,000 | $0 | $880,000 | $1,225,000 | $2,080,000 | $1,685,000 |
| Mike Linter | 6 | 0 | 3 | $925,000 | $125,000 | $250,000 | $550,000 | $1,725,000 | $925,000 |
| William McCaffrey | 3 | 1 | 2 | $1,000,000 | $170,000 | $0 | $10,000 | $1,010,000 | $180,000 |
| Individual Total | 32 | 2 | 13 | $3,460,000 | $568,000 | $945,000 | $5,565,000 | $9,970,000 | $7,078,000 |
| Foundation Strategy | | | | | | | | | |
| Harriet Able | 2 | 0 | 1 | $1,000,000 | $0 | $0 | $150,000 | $1,150,000 | $150,000 |
| Joan Anderson | 1 | 0 | 1 | $350,000 | $0 | $0 | $0 | $350,000 | $0 |
| Annie Barr | 1 | 1 | 1 | $0 | $0 | $0 | $1,250,000 | $1,250,000 | $1,250,000 |
| Jim Edwards | 1 | 0 | 1 | $0 | $0 | $1,750,000 | $0 | $1,750,000 | $1,750,000 |

Page 1 of 2

Status Report

Capital Campaign $10,000,000 12/30/2002

*TARGET HIGH>50K AND ALL ASKED FORS TO BE CONTACTED 1/1-2/15/02*

Page: 4
Date: 01/07/2002

| PRI | Prospect | Caller | Next Contact | Purpose | Target Amount High | Target Amount Low | Asked For Amount | Committed Amount | Phone #s |
|---|---|---|---|---|---|---|---|---|---|
| | Corporate Strategy | | | | | | | | |
| 3 | Turner Corporation. | | | | $0 | $0 | $15,000 | $0 | W (510) 555-4878 ext 23 H |
| | | Linker, Mike | 01/22/2002 | Waiting for response on the ask. | | | | | |
| | COMMENTS: | *exceeded sales goal for fiscal year in 01* | | | | | | | |
| | Corporate Total | Prospects | 1 | | $0 | $0 | $15,000 | $0 | |
| | GRAND TOTAL | Prospects | 14 | | $3,200,000 | $635,000 | $2,710,000 | $0 | |

GRAND TOTAL SCENARIOS  BEST CASE    WORST CASE
                       $5,910,000   $3,345,000

Page 4 of 4

FIGURE 13C

Status Report             Page: 1
Wildhorse Canyon Campaign    $24,000,000    09/30/2001           Date: 12/17/2000

| PRI | Prospect | Caller | Next Contact | Purpose | Target Amount High | Low | Asked For Amount | Committed Amount | Phone #s |
|---|---|---|---|---|---|---|---|---|---|
| | Individual Strategy | | | | | | | | |
| 4 | Praff, Jerry | | | | $1,000,000 | $0 | $0 | $0 | W H |
| | | Swindells, Butch | 04/18/2000 | fly to ranch with Bill Hall. | | | | | |
| | COMMENTS: | *Close friends with Harry Merlo.* | | | | | | | |
| 1 | Solbrack, Tom and Vicky | | | | $500,000 | $0 | $0 | $50,000 | W H |
| | | McAlonen, Jay | 07/07/2000 | Gift of $3500 came in towards commitment. TY letter and photos sent. | | | | | |
| | | Klaustermeyer, Jim | | | | | | | | |
| | COMMENTS: | *Land gift could come in the future. Not now. We need to know from Robertson if this is accurate. Received 2nd letter of intent for an additional $10,000 on 8/30/99.* | | | | | | | |
| 2 | Stott, Peter and Julie | | | | $500,000 | $25,000 | $0 | $0 | W H |
| | | Leone, Mike | 11/10/2000 | Call Butch after election | | | | | |
| | | Lomax, Neil and | | | | | | | | |
| | | Swindells, Butch | 04/18/2000 | Butch will keep cultivating. Patience. Possible flight for Julie Stott to ranch. | | | | | |
| | COMMENTS: | *PSN - Crown Pacific, Ltd. Knows Neil Lomax. Owns his own plane. Could be in process of selling company - has hired investment broker to get shareholders maximized. Don't push on donation. Be patient.* | | | | | | | |

Page 1 of 5

Caller Analysis Report

Capital Campaign  $10,000,000  12/30/2002

Page: 15
Date: 01/07/2002

*ALL PRIMARY CALLERS' ASSIGNMENTS FOR 1/1-2/15/02*

CALLER: McCaffrey, William

| PRI | Prospect | Next Contact | Purpose | Target Amount High | Target Amount Low | Asked For Amount | Committed Amount | Phone #'s |
|---|---|---|---|---|---|---|---|---|
| 3 | Danvers, Judy | | | $2,000 | $1,000 | $0 | $0 | W |
| | | 02/05/2002 | Invite to small group dinner. | | | | | H |
| 3 | Keiser, Don and Sally | | | $2,000 | $1,000 | $0 | $0 | W |
| | | 02/05/2002 | Invite to small group dinner | | | | | H |
| 3 | Long, Bob and Sue | | | $1,500 | $1,000 | $0 | $0 | W |
| | | 02/05/2002 | Invite to small group dinner. | | | | | H |
| 3 | Scott, John | | | $2,000 | $1,500 | $0 | $0 | W |
| | | 02/05/2002 | Invite to dinner | | | | | H |
| 3 | Walton, David | | | $1,750 | $1,000 | $0 | $0 | W |
| | | 02/05/2002 | Invite to small group dinner. | | | | | H |
| | Caller Total | Prospects: | 5 | $9,250 | $5,500 | $0 | $0 | |

Page 15 of 16

FIGURE 15C

Caller Archive Report

Capital Campaign $10,000,000 12/30/2002

*Review Contact With Prospects*

Page: 1
Date: 08/07/2000

| PRI | Prospect | Caller | Target Amount High | Target Amount Low | Asked For Amount | Committed Amount | When Contacted | Purpose |
|---|---|---|---|---|---|---|---|---|
| Individual Strategy | | | | | | | | |
| 2 | Culver, Betty | | | | | | | |
| | | Adams | $0 | $0 | $0 | $20,000 | 08/07/2002 | met with Betty, wait to hear from Betty on $20,000 gift. |
| | | Edwards | $0 | $0 | $0 | $0 | 08/07/2002 | met with Betty, wait to hear from Betty on $20,000 gift. |
| | | Adams | $20,000 | $10,000 | $0 | $0 | 06/03/2002 | Jerry arrange lunch with Betty to ask for $20,000 gift based on discussion with Betty and her brother. |
| | | Edwards | $0 | $0 | $0 | $0 | 06/03/2002 | Jerry arrange lunch with Betty to ask for $20,000 gift based on discussion with Betty and her brother. |
| | | Adams | $10,000 | $5,000 | $0 | $0 | 05/18/2002 | Dinner with Betty and her brother to discuss their family's interest in project and giving capability. |
| | | Edwards | $0 | $0 | $0 | $0 | 05/18/2002 | Dinner with Betty and her brother to discuss their family's interest in project and giving capability. |
| | | Adams | $10,000 | $5,000 | $0 | $0 | 04/08/2002 | Set up meeting with Betty to introduce her to the project. Make sure Jim Edwards can be there. |
| | | Edwards | $0 | $0 | $0 | $0 | 04/08/2002 | Set up meeting with Betty to introduce her to the project. Make sure Jim Edwards can be there. |

Page 1 of 2

FIGURE 17B

Caller Archive Report

Capital Campaign  $10,000,000  12/30/2002

*Review Contact With Prospects*

Page: 2
Date: 08/07/2000

| PRI | Prospect | Caller | Target Amount High | Target Amount Low | Asked For Amount | Committed Amount | When Contacted | Purpose |
|---|---|---|---|---|---|---|---|---|
| Foundation Strategy | | | | | | | | |
| 1 | State Foundation, Jim Stem-Director | | | | | | | |
| | | Barr | $0 | $0 | $0 | $1,250,000 | 05/00/2002 | Write thank you letter for gift. |
| | | Barr | $0 | $0 | $0 | $1,250,000 | 05/01/2002 | Received letter with $1,250,000 check! |
| | | Barr | $0 | $0 | $1,250,000 | $0 | 04/25/2002 | Await decision fro April board meeting. |
| | | Barr | $0 | $0 | $1,250,000 | $0 | 02/08/2002 | Call to ensure receipt of proposal. |
| | | Barr | $0 | $0 | $1,250,000 | $0 | 01/25/2002 | Send in proposal. |
| | | Barr | $1,250,000 | $750,000 | $0 | $0 | 01/15/2002 | Finish final proposal draft to send in by 1/25/02. |
| | | Barr | $1,250,000 | $750,000 | $0 | $0 | 01/04/2002 | Write first proposal draft. |

Page 2 of 2

FIGURE 17C

| Duplicate Prospects | | | | | | | |
|---|---|---|---|---|---|---|---|
| Source Campaign | | | | | | | |
| Prospect Last | First | Caller | Next Activity | Target High | Target Low | Asked For | Committed |
| • Adams | Flo | Barrett | 08/13/1999 | $0.00 | $0.00 | $0.00 | $0.00 |
| • Agnew | Dan | Leone | 11/03/2000 | $100,000.00 | $0.00 | $0.00 | $0.00 |
| • All State Found | Gregory T. L. | Haas | 11/29/1999 | $7,000.00 | $1,000.00 | $0.00 | $0.00 |
| • Allied Christian | James Peters | Eney | 06/21/2000 | $25,000.00 | $5,000.00 | $0.00 | $0.00 |
| ▶ Alpine Educatio | | Leone | 07/13/2000 | $0.00 | $0.00 | $0.00 | $2,000.00 |
| • Amondson | Neil | Leone | | $0.00 | $0.00 | $0.00 | $0.00 |
| Anderson | Bill and Ging | Eney | 06/21/2000 | $0.00 | $1,000.00 | $0.00 | $75,000.00 |
| Anderson | Chuck & Barl | Gillet | 07/18/2000 | $0.00 | $0.00 | $0.00 | $0.00 |
| Anderson | Mark | Axthelm | | $5,000.00 | $500.00 | $0.00 | $0.00 |

Choose Campaign [Disable Kids ▼] [Get Prospects] [Copy Selected]

| Disable Kids | | | | | | | |
|---|---|---|---|---|---|---|---|
| Prospect Last | First | Caller | Next Activity | Target High | Target Low | Asked For | Committed |
| ▶ Adams | Flo | unassigned | | $0.00 | $0.00 | $0.00 | $0.00 |
| Agnew | Dan | Leone | | $0.00 | $0.00 | $0.00 | $0.00 |
| All State Found | Gregory T. L. | Haas | | $0.00 | $0.00 | $0.00 | $0.00 |
| Allied Christian | James Peters | Eney | | $0.00 | $0.00 | $0.00 | $0.00 |
| Alpine Educatio | | Leone | | $0.00 | $0.00 | $0.00 | $0.00 |
| Amondson | Neil | Leone | | $0.00 | $0.00 | $0.00 | $0.00 |

FIGURE 19

METHOD AND SYSTEM FOR MANAGING FUNDRAISING CAMPAIGNS

This application claims priority from provisional patent application No. 60/172,502, filed Dec. 17, 1999, and entitled METHOD AND SYSTEM FOR MANAGING FUND-RAISING CAMPAIGNS. This provisional application including all materials and appendices filed therewith is incorporated herein by reference.

COPYRIGHT NOTICE

An illustrative embodiment of the present invention is described below as it might be implemented on a general purpose computer or other information appliance using a programming language including graphical user interfaces. The figures include copyrighted graphical user interfaces. Permission is granted to make copies of the figures and appendix solely in connection with the making of facsimile copies of this patent document in accordance with applicable law; all other rights are reserved, and all other reproduction, distribution, creation of derivative works based on the contents, public display, and public performance of the application or any part thereof are prohibited by the copyright laws.

FIELD OF THE INVENTION

This invention relates to managing complex interactions and campaigns using a computer system. More particularly, the present invention is directed to methods and systems for managing donation campaigns, goals, and prospects. Still more specifically, the invention relates to managing fundraising campaigns for organizations.

BACKGROUND OF THE INVENTION

The initiative for developing the present invention arose from the frustration some of the present inventors experienced in trying to help campaign leaders follow through on the leaders promises regarding identifying, evaluating, contacting and following-up with a variety of donor prospects. Earlier software tools were good at reporting on what has happened, but are weak in managing forward looking activities. Most fund raising software packages are actually "rearview mirrors". They report on donor history and donor demographics and perform important accounting and tracking functions, but they are not equipped to manage campaign strategies with the precision and comprehensive view required.

In a previous system, inventors of the present invention attempted to address some forward looking needs of capital campaigns. An earlier, DOS-based software system (also based on the database programming application "DataPerfect") was initially introduced in 1987 as Tracker2 and has been used successfully in capital campaigns for over a decade. However, this system was implemented in a non-graphical user environment and lacked many features that the inventors have since developed to improve the assistance a software system can provide to a capital campaign. In particular, the system lacked an object oriented data structure for contacts and prospects, and ability to track prospects based on strategies, and ability to associate attributes with prospects, etc.

SUMMARY OF THE INVENTION

The present invention has been created to maximize the effectiveness of an organization in managing capital campaigns, annual funds, and fund-raising projects using one or more computer systems. Fund raising at its best is people giving to people and is driven by relationships. Managing various people relationships can become complicated and difficult, even in small campaigns and projects. The invention in one embodiment involves a software package designed to manage the complexities of campaigns and to make sure all staff and volunteer leaders are coordinated to carry out the research, preparation, solicitation and follow up that successful fund raising requires.

While previous tools are at times good at reporting on what has happened, they have generally been weak in managing processes such as: (1) Identifying and evaluating prospects against a specific strategy; (2) Keeping a priority focus regarding the who, when, how much, why and what's next in working with prospects; (3) Setting follow-up steps in terms of cultivating prospects and in light of the financial agenda, often involving multiple callers playing different roles; and (4) Accurately and precisely reporting on the campaign's strengths and weaknesses and clearly showing where the campaign is at in terms of meeting established goals and in terms of who is responsible for achieving identified goals and for the campaign's success.

While some systems on the market attempt to manage or store some of the above data, few if any report the data in the most powerful or provide a data configuration or user interfaces to maximize usability of the data in managing campaigns. Earlier tools often do not easily produce useful reports to hold callers and prospects accountable over and against a defined strategy.

Therefore, one feature of the invention in specific embodiments is that it will produce reports that show exactly what is happening with callers and donors vis-a-vis various micro and macro strategies. Campaign managers can know minute-by-minute where the campaign is in relation to the goal and the potential to reach the goal.

The present invention involves a relational view of data and data management used for fund raising projects or campaigns. A system according to the invention produces reports that are designed to manage fund raising at various levels (such as local, regional, national). A system according to the invention can manage a number of different campaigns and projects concurrently.

According to one embodiment, a system according to the present invention stores, provides interfaces to input and review and editing, provides effecting reporting and summary interfaces and therefore allows effective user review and analysis of the following:

1. Who are the priority prospects. (In specific embodiments, both in terms of those who have given and those who have not, and for example who have the potential in terms of ability and interest to give 90% of the fundraising goal.)
2. Who is to contact which prospects during a particular time frame and for what purpose, in relation to a strategy.
3. Who are all the contacts that are related to the priority prospects and what are their roles.
4. What are the various types of sources (or attributes), i.e., individuals, committee members, leaders, foundations, churches, etc., on the campaign prospect list and where are they in relation to the strategy and any established timetables.
5. How many prospects are there and at what stage are they in terms of being solicited. Examples of stages according to various embodiments of the invention include: (a) are they targeted, (b) have they been asked, (c) have they committed, (d) have they pledged, and (e) what are the amounts for each stage and the total.

6. How are the callers/solicitors (for example both paid staff and volunteers) performing with regard to the above items.

The present invention may be used in situations where organizations have other software packages or systems that include donor demographics, giving history, and accounting data. These systems metaphorically provide a "rear view mirror" through which an organization can see the fundraising ground it has covered to date. The present invention, by contrast, is designed to provide a forward-looking view of where a fundraising in going and the road ahead to meeting its goals, i.e. a "windshield".

A further understanding of the invention can be had from the detailed discussion of specific embodiments below. For purposes of clarity, this discussion may refer to devices, methods, and concepts in terms of specific examples. However, the method of the present invention may operate with a wide variety of types of devices. It is therefore intended that the invention not be limited except as provided in the attached claims.

Furthermore, it is well known in the art that logic or software systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in the specification, and the invention should not be limited except as provided in the embodiments described in the attached claims.

Various aspects of the present invention are described and illustrated in terms of graphical interfaces and reports that user will use in working with the systems and methods according to the invention. The invention encompasses the general software steps that will be understood to those of skill in the art as underlying and supporting the functional prompts and results illustrated.

All publications cited herein are hereby incorporated by reference in their entirety for all purposes. The invention will be better understood with reference to the following drawings and detailed description.

BRIEF DESCRIPTION OF THE DRAWINGS

FIG. 1 illustrates an example screenshot of an example graphical interface showing prospect status in relation to a particular campaign (in this example the Capital Campaign) according to an embodiment of the present invention.

FIG. 2 illustrates an example screenshot of an example graphical interface showing a caller archive for a particular prospect in a particular campaign according to an embodiment of the present invention.

FIGS. 12A–C illustrate a summary production report selection graphical interface and an example screen display of a resultant report according to specific embodiments of the present invention.

FIGS. 13A–D illustrate an overall Campaign status report selection graphical interface and an example screen display of a resultant report according to specific embodiments of the present invention.

Figure 15B:
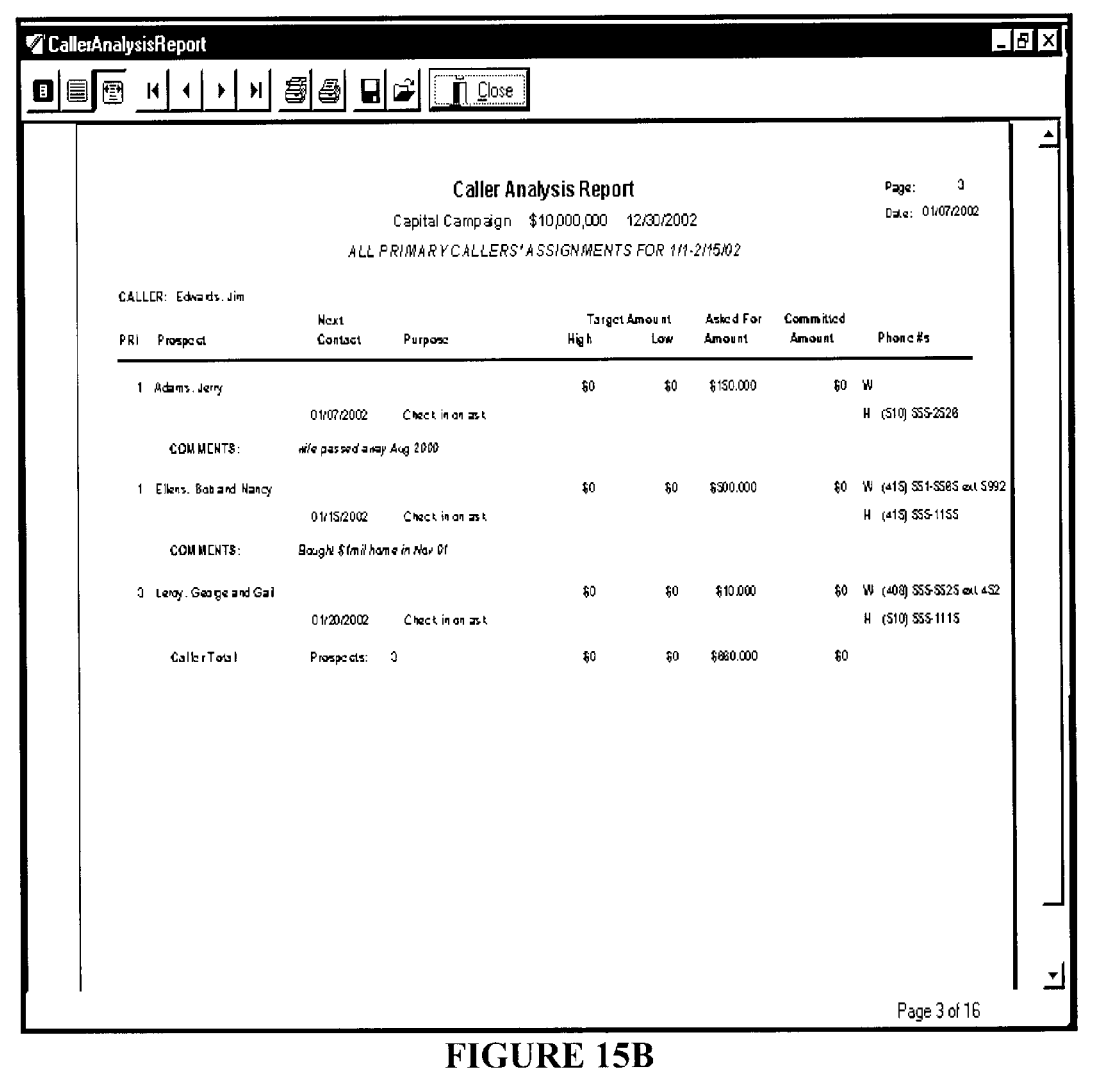

FIGS. 15A–D illustrate a Caller Analysis report selection graphical interface and an example screen display of a resultant report according to specific embodiments of the present invention.

FIGS. 17A–C illustrate an Caller Archive status report selection graphical interface and an example screen display of a resultant report according to specific embodiments of the present invention.

FIG. 19 illustrates a Duplicate Prospects graphical interface allowing a user to select prospects from a Source Campaign and duplicate prospect information and associations into a different campaign according to specific embodiments of the present invention.

DESCRIPTION OF SPECIFIC EMBODIMENTS

The present invention, in particular embodiments, involves the concept of "Taking Donors Seriously"™. This means every donor prospect is identified, regardless of giving potential, and is matched with a fund raising strategy that fits the prospect.

The present invention, in particular embodiments, involves the concept that there are three kinds of money to track in a campaign or project: targeted, asked for, and committed (or, stated another way, theoretical, on the table, and in the bank). Campaigns try to move the money from (a) just being thought about to (b) being considered to (c) being committed.

Because people give to people, the challenge in raising money is to make sure the right person is asking at the right time in the right way for the right amount. Every prospect who has the potential to give a major gift needs to have someone—e.g., a caller—who is responsible for making sure the prospect is taken seriously and is asked to make a gift. Prospects who are not major gift prospects are identified with a group strategy and also taken seriously. Thus, the present invention, in particular embodiments, incorporates a contact-focused approach to handling fundraising data. For example, according to specific embodiments of the invention, the invention allows multiple contacts to be associated with a prospect in a single prospect record.

1. Strategies

In fund raising there generally two kinds of money: capital and operational. The strategies for raising capital and operational are generally very different. Overall it's an 80/20 world where 20% of the donors give 80% of the money. But in capital campaigns 10% or less of the donors give 90% or more of the money. In healthy annual campaigns, 40% of the donors give 60% of the money.

Therefore, the present invention, in particular embodiments, is able to identify different strategies and the number and potential of the prospects for the strategies. As these factors are made clear they can be placed on a campaign timetable so the campaign leaders can discipline the campaign to stay on schedule, on task, and on the monthly goals.

Figure 9:
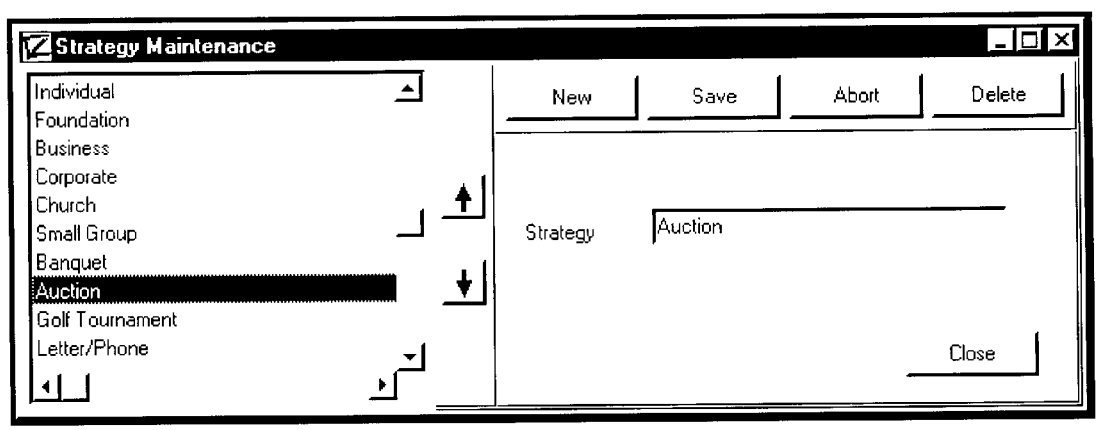
FIG. 9 illustrates an example screenshot of an example graphical interface showing a strategy maintenance graphical interface according to an embodiment of the present invention.

As will be further understood from the teachings provided herein, the present invention provides for strategies by associating a data field, which in specific embodiments can be called "strategy" with every prospect that is assigned to a campaign. FIG. 9 illustrates an example screenshot of an example graphical interface showing a strategy maintenance graphical interface according to an embodiment of the present invention. As will be seen, a user can use this interface to define a new strategy, to save a strategy, and to change the order that strategies will be listed in reports. In a particular embodiment, a strategy is simple a text string that a user selects and that can then be used to help organize and track campaign activities. In a particular embodiments, strategies are associated with prospects in a campaign using the rule that every prospect in a campaign must be associated with one and only one strategy for that campaign. In further particular embodiments, a new prospect added to a campaign can be added with a default strategy, such as "individual," or every new prospect can be added to a campaign using the last strategy selected for that campaign.

2. Example Screen Captures of Graphical Data Interfaces

A further understand of the present invention, including of further features of specific embodiments, can be had by considering the example screen shots illustrated in the figures and discussion of example implementations of a system according to the present invention as discussed below. It will be understood that these Figures are not intended to illustrate every possible data interface screen that will be needed in a system according to specific embodiments of the invention, and that more generic and commonly understood interfaces, such as for file saving or report printing, are not shown.

Figures 1, 2:
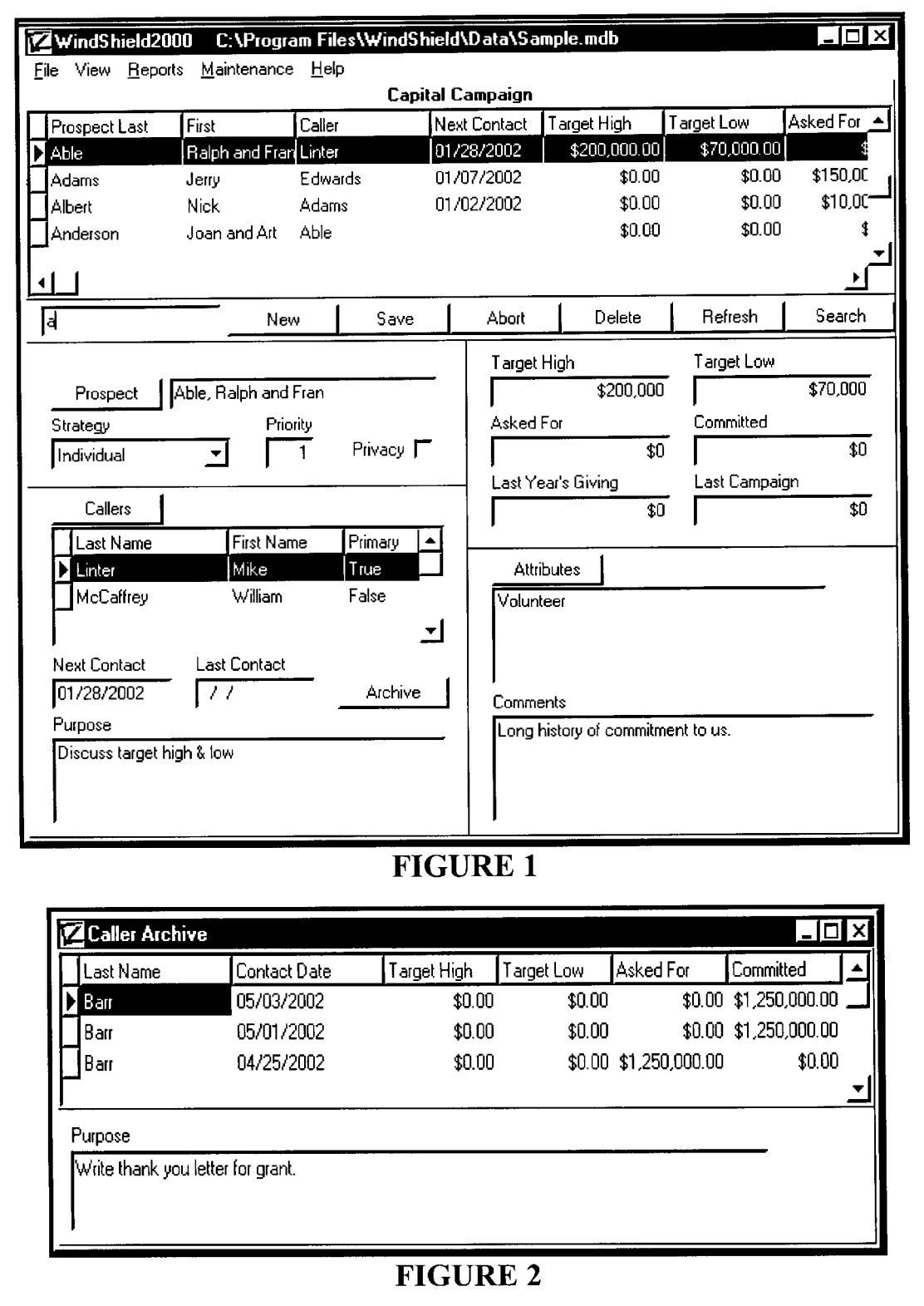

FIG. 1 illustrates an example screenshot of an example graphical interface showing prospect status in relation to a particular campaign (in this example the Capital Campaign) according to an embodiment of the present invention. As illustrated, an example campaign (or project) data set includes a number of prospects, identified by name, primary caller, action date (such as next contact date), target amounts (High and Low), and an asked for amount. Several callers can be associated with a single prospect, as shown. Other relevant items of data according to further specific embodiments of the invention, can be associated with a particular prospect, with some examples shown including last years giving, last campaign, comments, etc. The screen shot shown in FIG. 1, generally indicates only a portion of the total data fields stored for the highlighted prospect.

Figure 5:
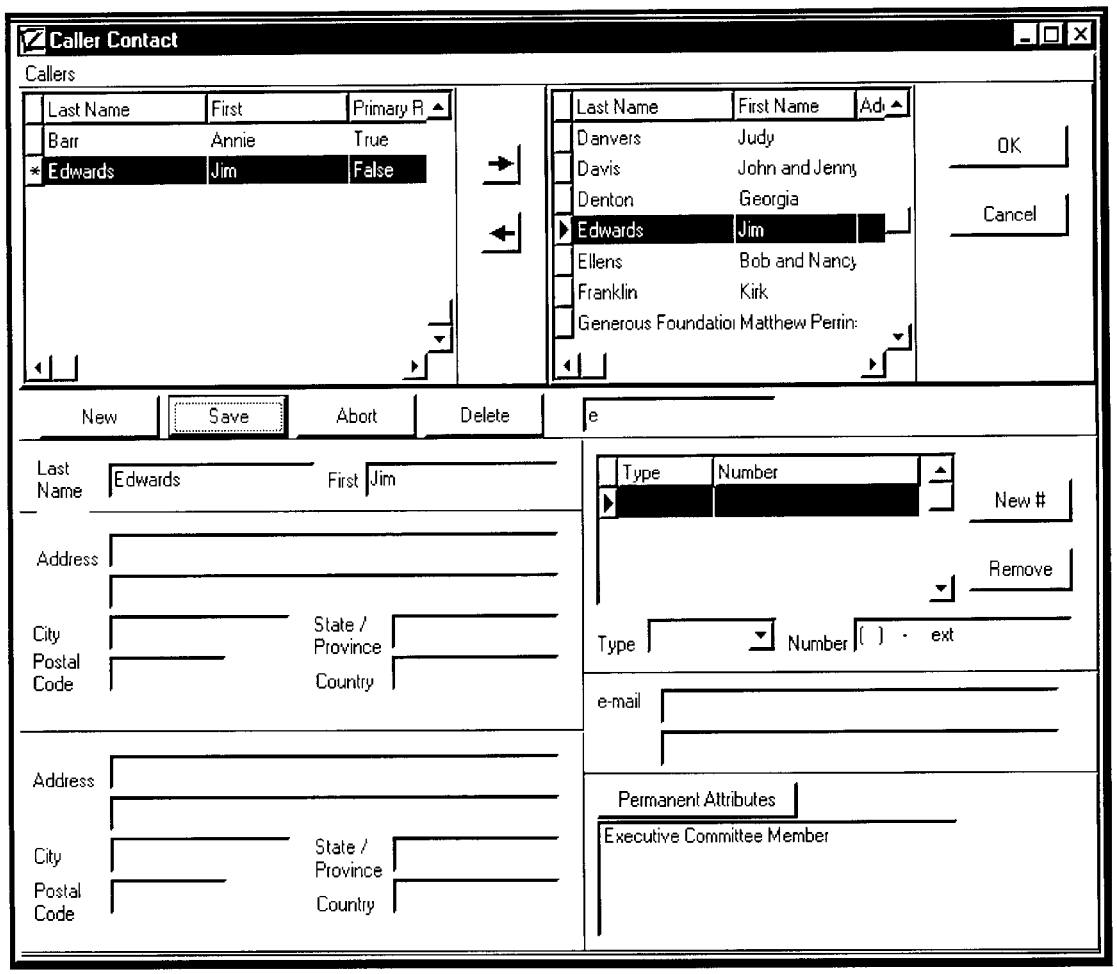
FIG. 5 illustrates an example screenshot of an example graphical interface showing accessing detailed caller contact data according to an embodiment of the present invention and selecting from all available callers (on the right) to associated a caller with a list of callers for a prospect (on the left).
Figure 6:
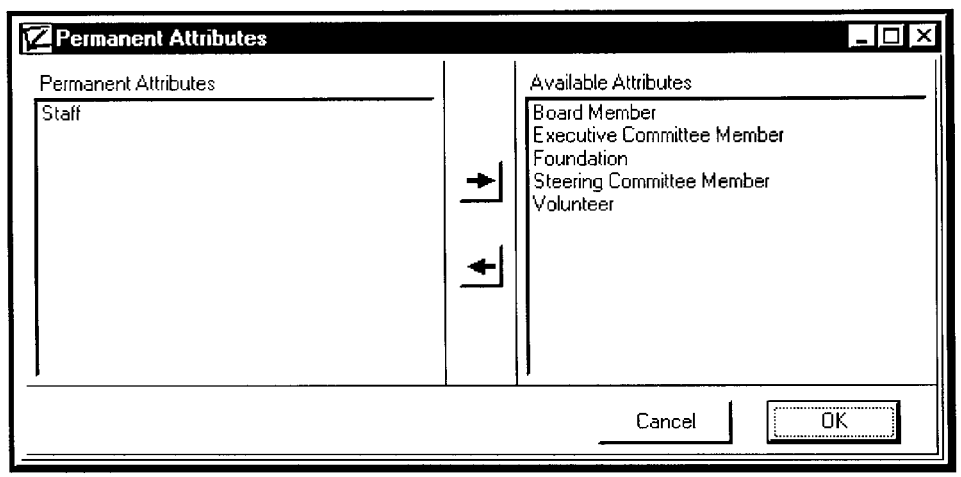
FIG. 6 illustrates an example screenshot of an example graphical interface showing a sub-window that can be activated to add or change a permanent attribute for a contact.

Note that fields such as "Prospect", "Callers", "Attributes" are shown as buttons in this figure, to indicate that if selected (clicked) these buttons will activate another screen. As a specific example, the Attributes button will open a window such as shown in FIG. 6; Prospect may open a window as shown in FIG. 3; and Callers may open a window as shown in FIG. 5.

FIG. 2 illustrates an example screenshot of an example graphical interface showing a caller archive for a particular prospect in a particular campaign according to an embodiment of the present invention. As illustrated in the figure, this archive includes activities that can guide follow-up dates with a prospect or can help track previous contacts.

Figure 3:
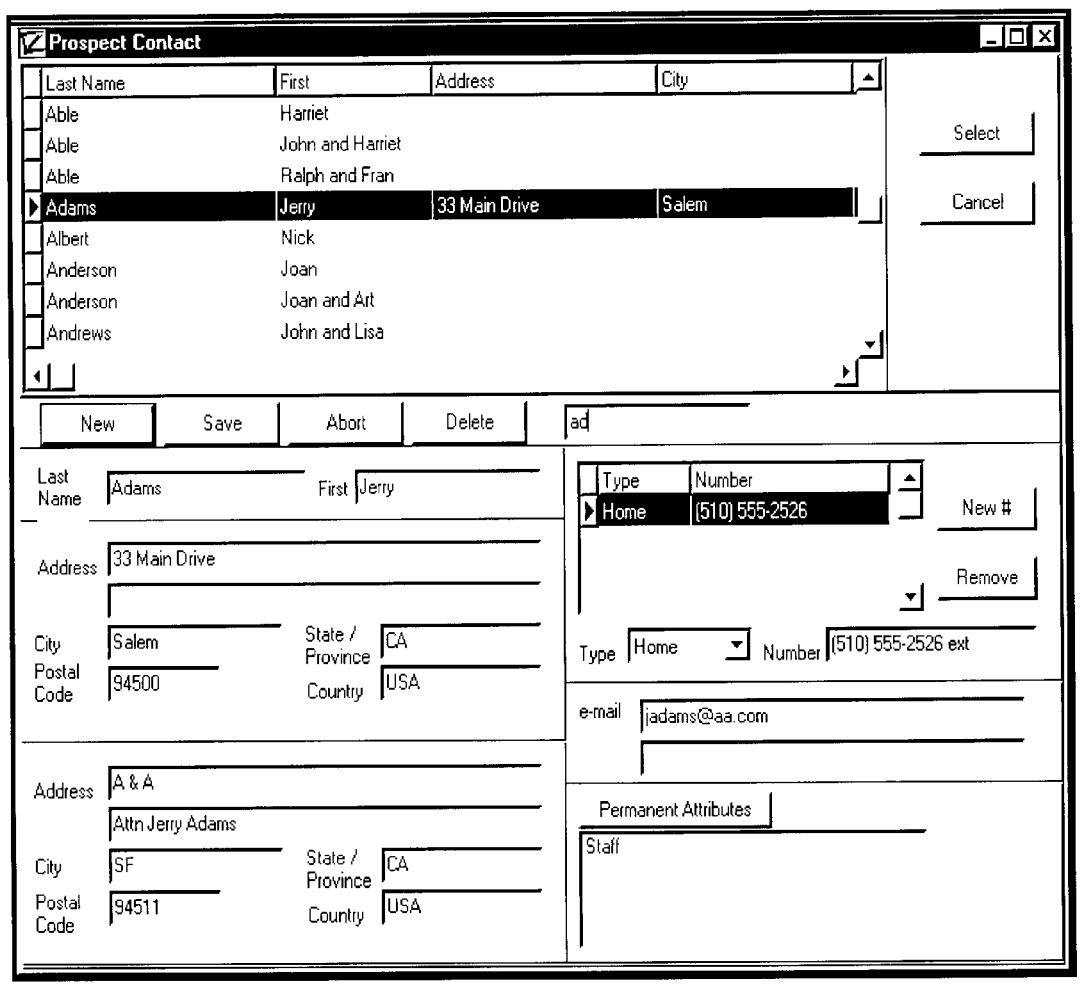
FIG. 3 illustrates an example screenshot of an example graphical interface showing prospect contact data and allowing adding/association of a contact record as a prospect in a particular campaign according to an embodiment of the present invention.

FIG. 3 illustrates an example screenshot of an example graphical interface showing prospect contact data and allowing adding/association of a contact record as a prospect in a particular campaign according to an embodiment of the present invention. Various contact information can be kept according to specific embodiments of the present invention as shown in the figure. In particular, one or more defined permanent attributes can be associated with a contact as described herein.

Figure 4:
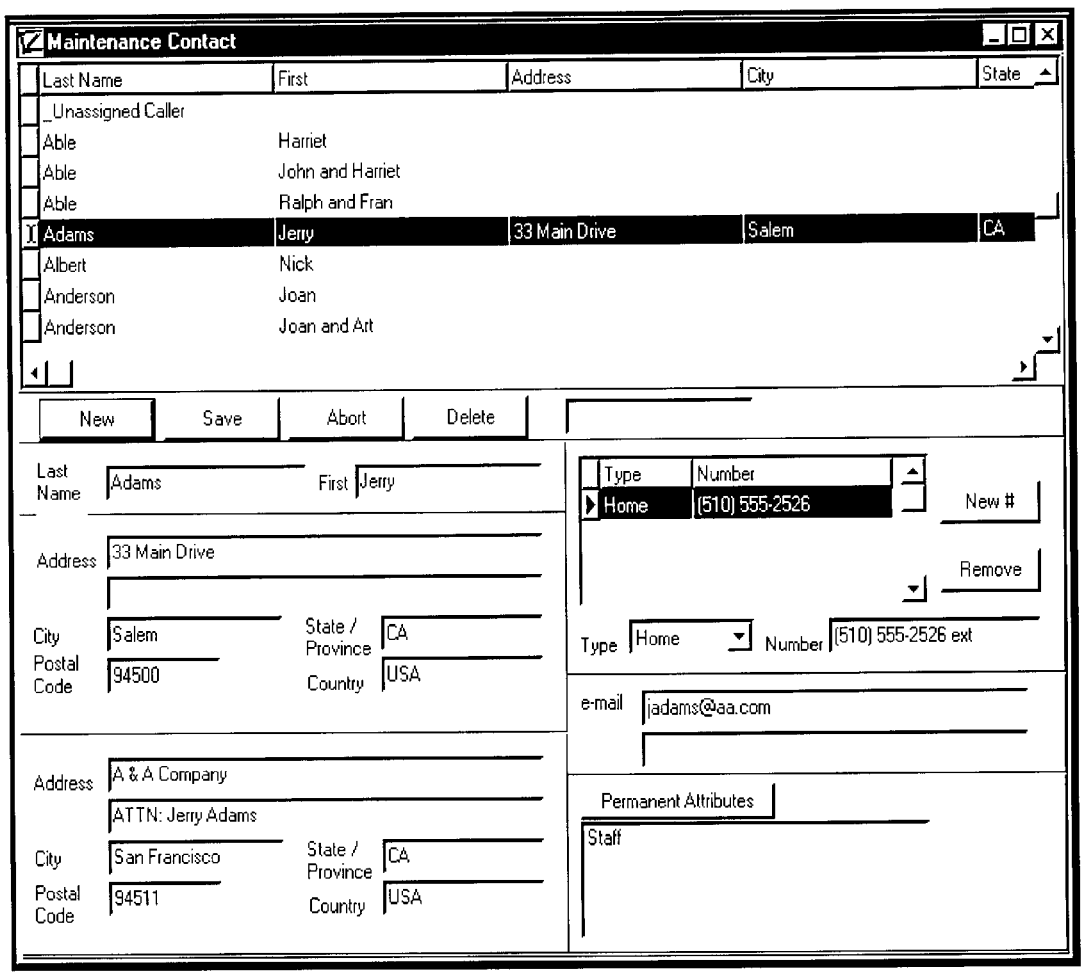
FIG. 4 illustrates an example screenshot of an example graphical interface showing a maintenance contact data graphical interface according to an embodiment of the present invention.

FIG. 4 illustrates an example screenshot of an example graphical interface showing a maintenance contact data graphical interface according to an embodiment of the present invention This screen can be used to perform maintenance functions and functions to reconfigure the illustrated contact data. Note that this figure is similar to FIG. 3 and differs in that from this screen contacts in the contact database cannot be associated with a campaign. Also, this figure illustrates the unified nature of the database in that contact data includes all contact data for both any potential callers and any potential prospects. These contacts can then be associated as callers and prospects for individual projects/campaigns in the individual project/campaign data structure.

FIG. 5 illustrates an example screenshot of an example graphical interface showing accessing detailed caller contact data according to an embodiment of the present invention and selecting from all available callers (on the right) to associated a caller with a list of callers for a prospect (on the left). As indicated in the figure, this interface can be used to add or delete caller associations from a prospect record in a project/campaign and to designate a caller as a primary caller. According to specific embodiments of the invention, designation of a primary caller automatically undesignates any other primary caller. As can be seen in the figure, the contact data for a caller is the same as the contact data for a potential prospect. This is because callers and prospects are all contacts maintained in the database for an institution. Thus a caller contact, as shown in this screen, can also have permanent attributes associated therewith. FIG. 6 illustrates an example screenshot of an example graphical interface showing a sub-window that can be activated to add or change a permanent attribute for a contact. This subwindow can be activated from either a caller contact screen, a prospect contact screen, or from a maintenance contact screen. Regardless of from which screen it is called, the screen allows designation of one or more permanent attributes from a list of available attributes as shown. According to further specific embodiments of the invention, once designated, those attributes are available and associated with a contact for all roles in all campaigns.

Figure 7:
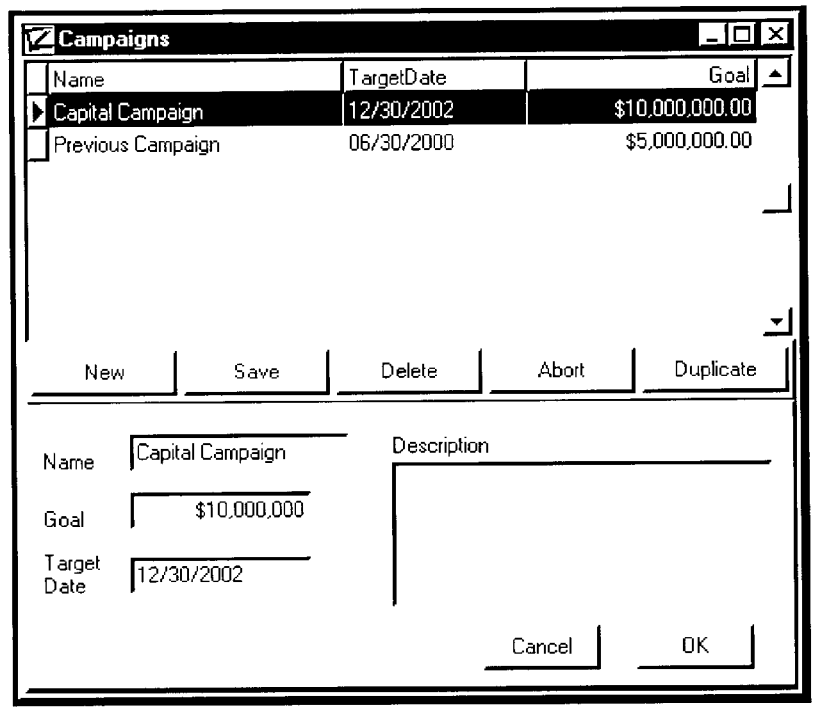
FIG. 7 illustrates an example screenshot of an example graphical interface showing Project/Campaigns selection and attributes graphical interface according to an embodiment of the present invention.

FIG. 7 illustrates an example screenshot of an example graphical interface showing Project/Campaigns selection and attributes graphical interface according to an embodiment of the present invention. From this interface, a manager can review certain campaign-wide data, and can create, delete, or duplicate a campaign. As shown in the figure, a campaign can be created by giving it a name, and then optionally included the other information shown of target amount and date. Once created, prospects can be associated with a campaign as described herein.

Figure 8:
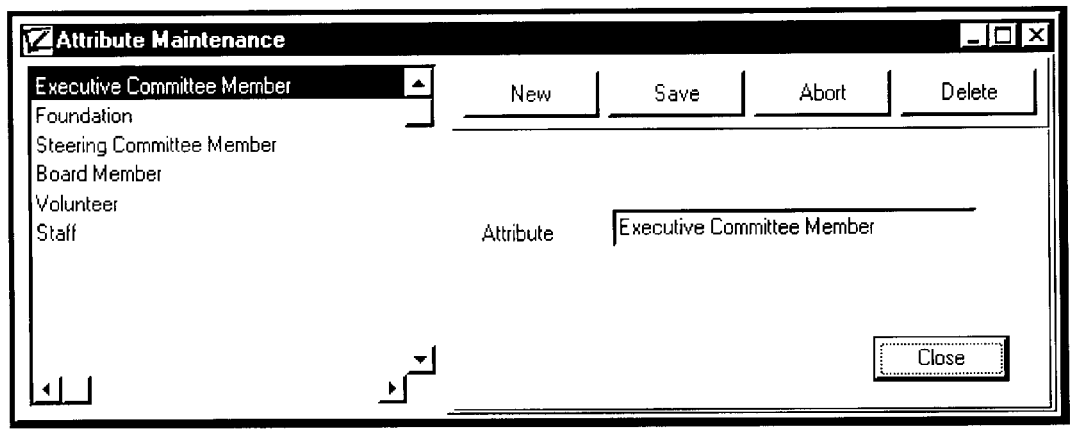
FIG. 8 illustrates an example screenshot of an example graphical interface showing an attribute maintenance graphical interface according to an embodiment of the present invention.
Figure 10:
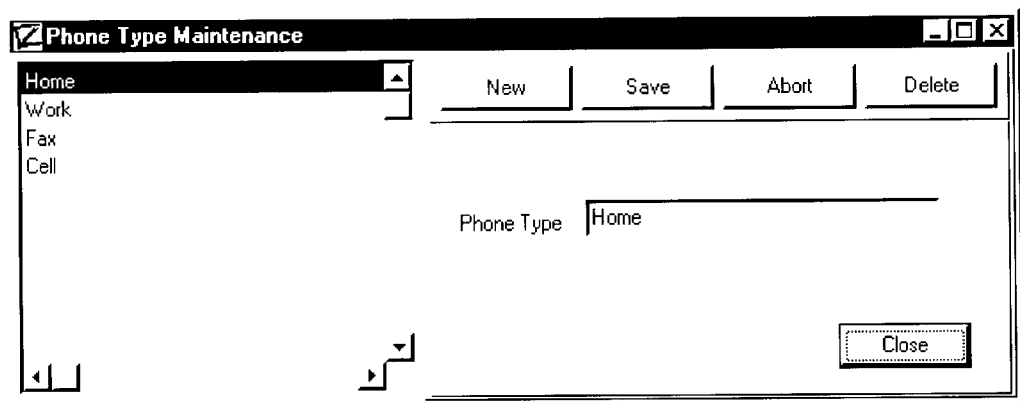
FIG. 10 illustrates an example screenshot of an example graphical interface showing a phone type maintenance graphical interface according to an embodiment of the present invention.

FIG. 8 through FIG. 10 illustrate similar various subscreens that can be used for adding or deleting allowed values for database-wide available data fields, such as Attributes, Strategies, Phone Types. As shown in the figure, these fields can be created simply by defining a name for the field. Once created, Attributes can be associated with contacts on a system system-wide basis (Permanent Attributes) or with a prospect in a particular campaign (Attributes). Once created, a Strategy can be (and according to further specific embodiments of the invention must be) associated with each prospect in a particular campaign. Once created, Phone Types can be associated with phone numbers in the contact database. FIG. 9 further illustrates that strategies can be placed in a particular order, using the arrow keys, and that order can then be used for various reporting functions as described further herein.

Figure 11:
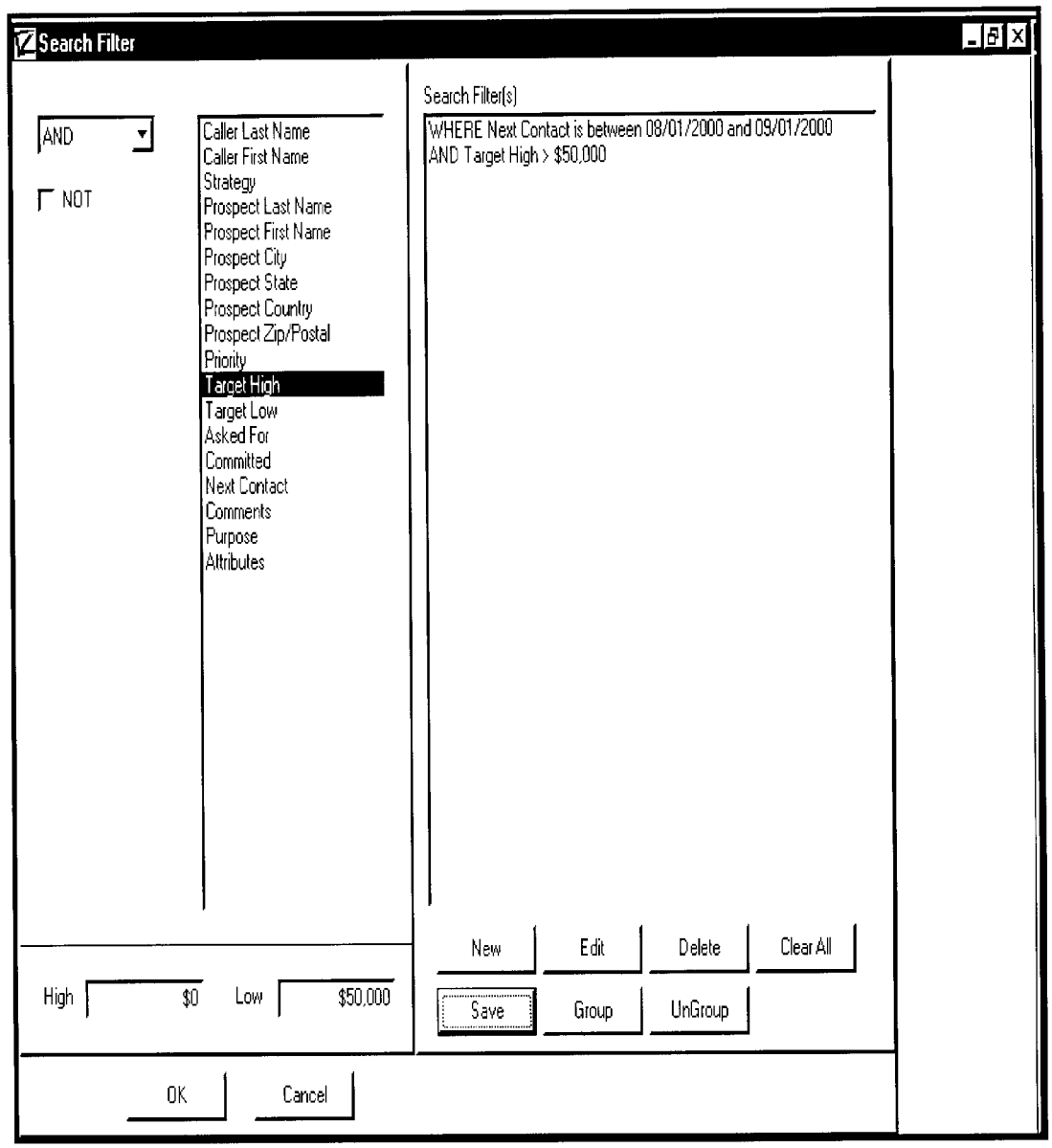
FIG. 11 illustrates a search filter graphical interface according to an embodiment of the present invention.

FIG. 11 illustrates a search filter graphical interface according to an embodiment of the present invention. According to further specific embodiments of the present invention, attribute filters are added as an on-screen filter options. Secondary Caller can be included in searches on Next Contact. It is also possible to filter or report on priority unassigned.

FIG. 19 illustrates a Duplicate Prospects graphical interface allowing a user to select prospects from a Source Campaign and duplicate prospect information and associations into a different campaign according to specific embodiments of the present invention.

3. Reports

An important factor identified for successful campaigns is the ability to manage key data and to produce useful reports and management tools from the collected data. The present invention, in particular embodiments, therefore emphasizes a number of flexible and manager-useful reports, some of which can be used daily in campaigns to help campaign directors keep on top of the complexity of their campaigns.

A number of different standard reports are described below and are illustrated in the accompanying drawings. From the teachings provided herein, it will be understood that additional reports are within the scope of the invention. Various particular aspects of reports and methods for selecting and generating reports according to specific embodiments of the invention will be understood to those of skill in the art from this description and the drawings.

3.1. Summary Production Report

Figure 12A:
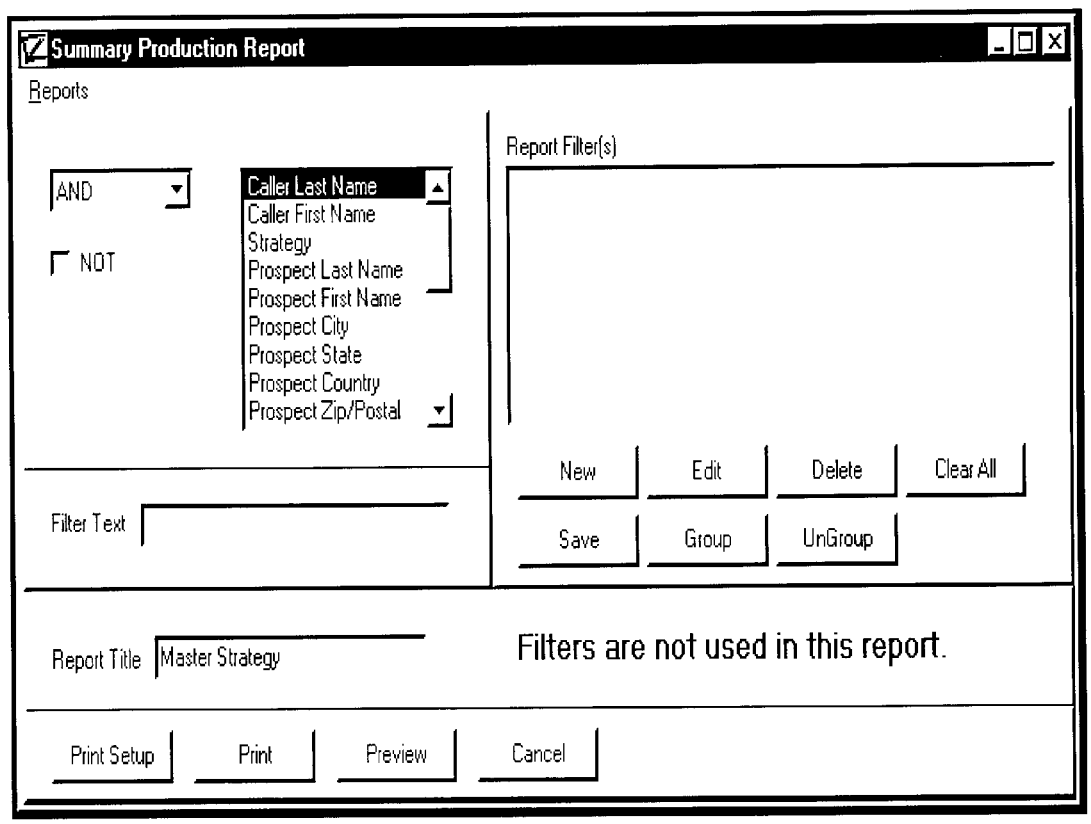
Figure 12C:
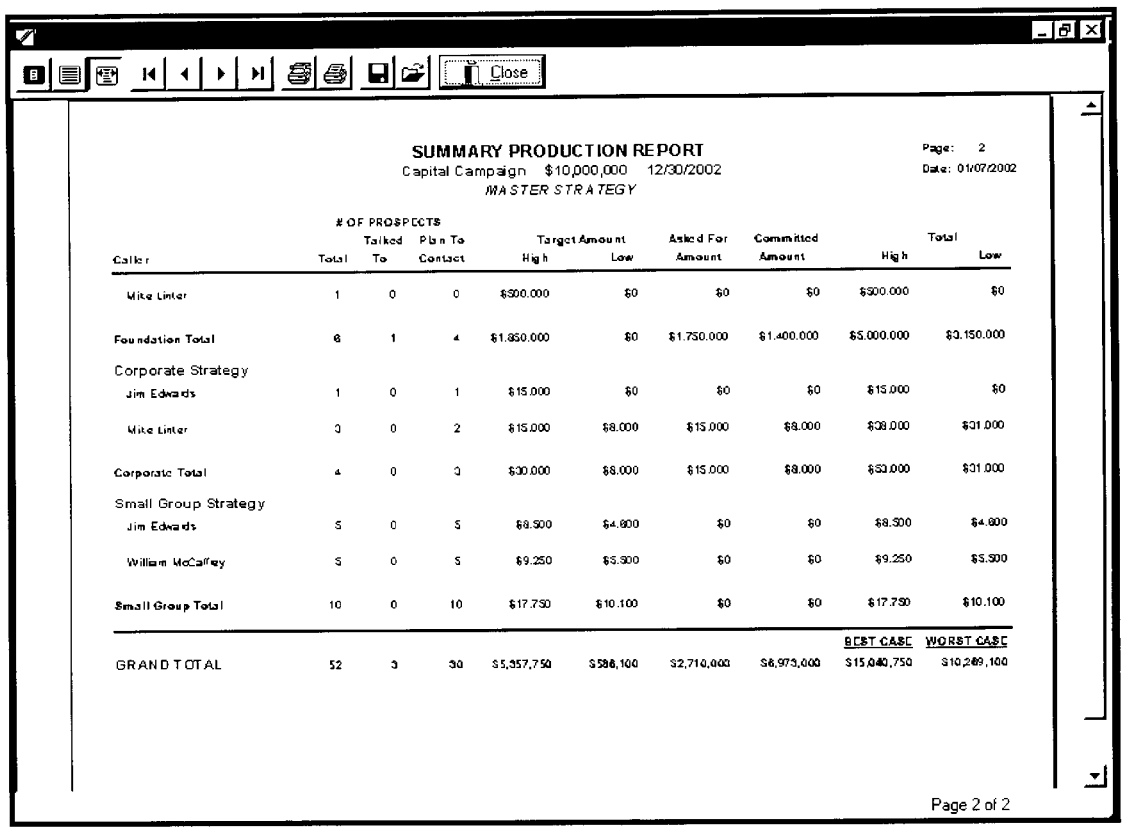

This report can provide the road map for a campaign/project. It summarizes the entire campaign by summarizing the assignments of all campaign callers and summarizing campaign strategies. This report does not show individual prospects and therefore is not confidential. It is a good tool to use with committees and boards to report on the overall campaign and point out the key leaders and strategies identifying where the campaign stands in relation to the goal. FIGS. 12A–C illustrate a summary production report selection graphical interface and an example screen display of a resultant report according to specific embodiments of the present invention. Note that in specific embodiments, for a particular campaign, this report lists data sorted by campaign strategies.

3.2. Status Report

Figure 13A:
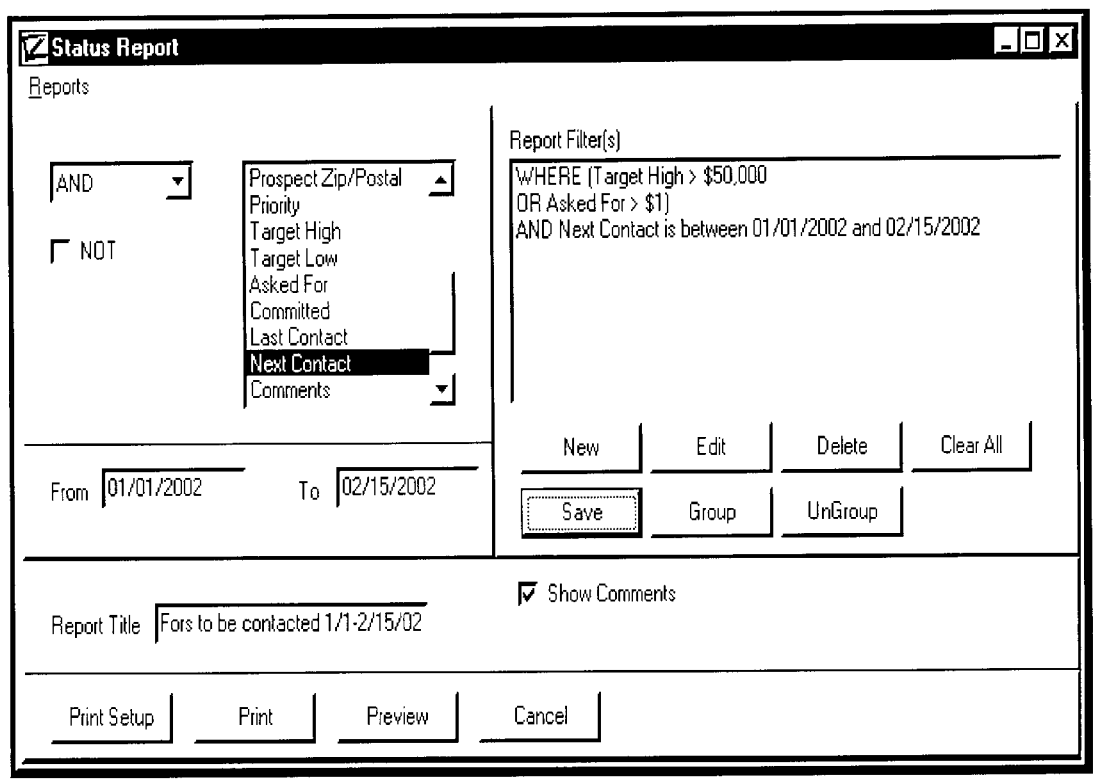
Figure 13B:
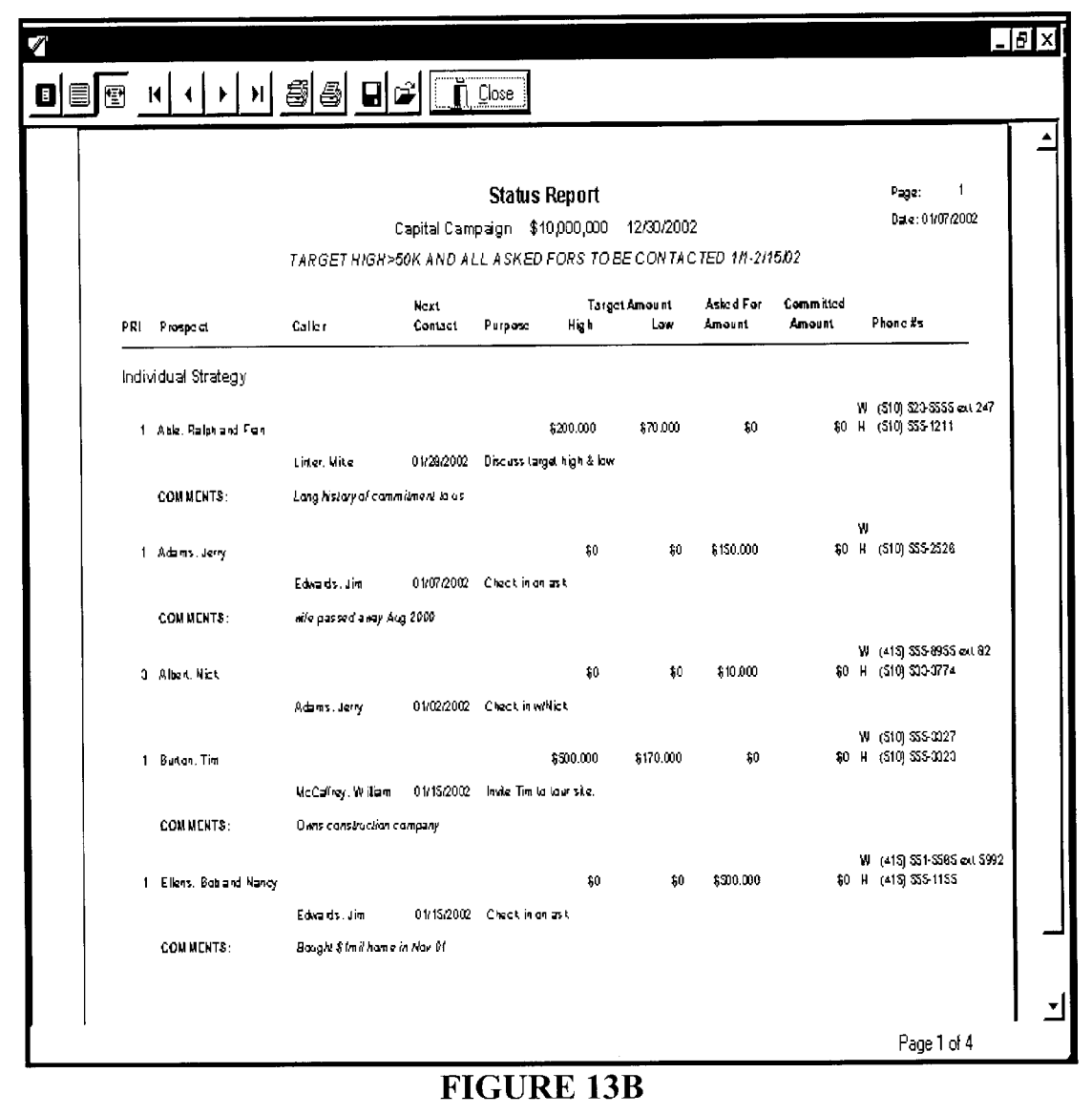

This report is road map for all callers or for callers on a particular type of prospect, e.g., foundation, and can be identical in form to the Caller Analysis Report. This report is helpful when campaign leaders are focusing on prospects and strategies and not so much on the callers, per se. FIGS. 13A–D illustrate an overall Campaign status report selection graphical interface and an example screen display of a resultant report according to specific embodiments of the present invention. FIG. 13D, in particular, illustrates an option that allows including comments directly in a status report.

3.3. Campaign/Project Prospect List Report

Figure 14A:
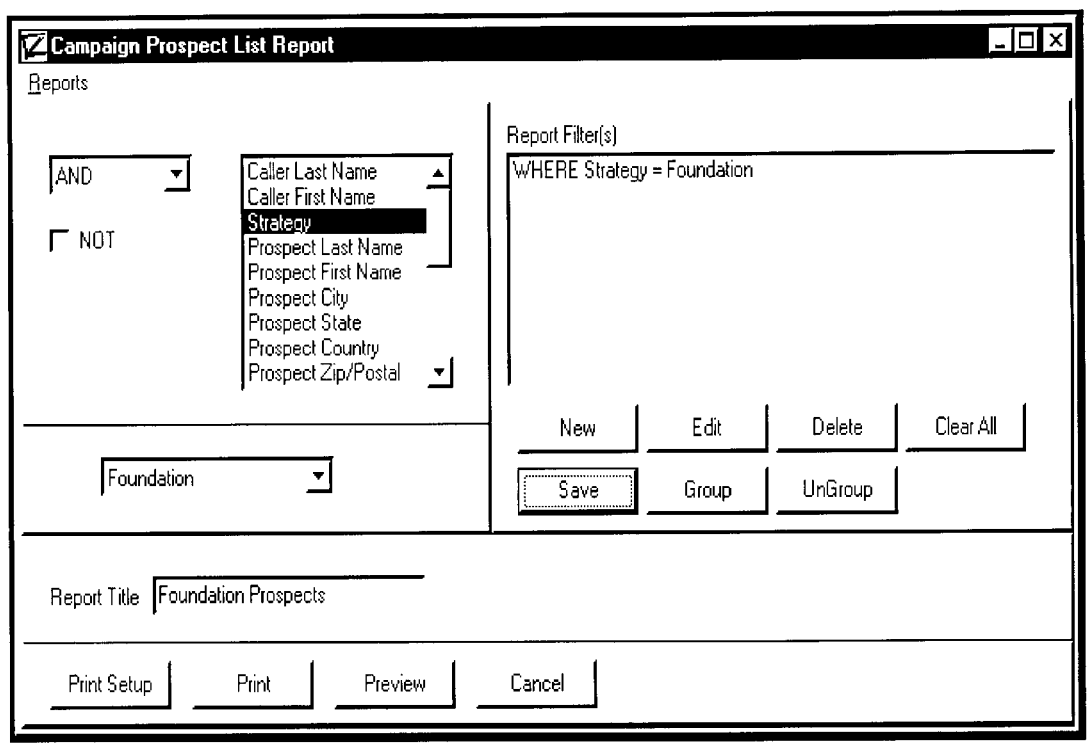
FIGS. 14A–C illustrate an Campaign Prospect List status report selection graphical interface and an example screen display of a resultant report according to specific embodiments of the present invention.
Figure 14B:
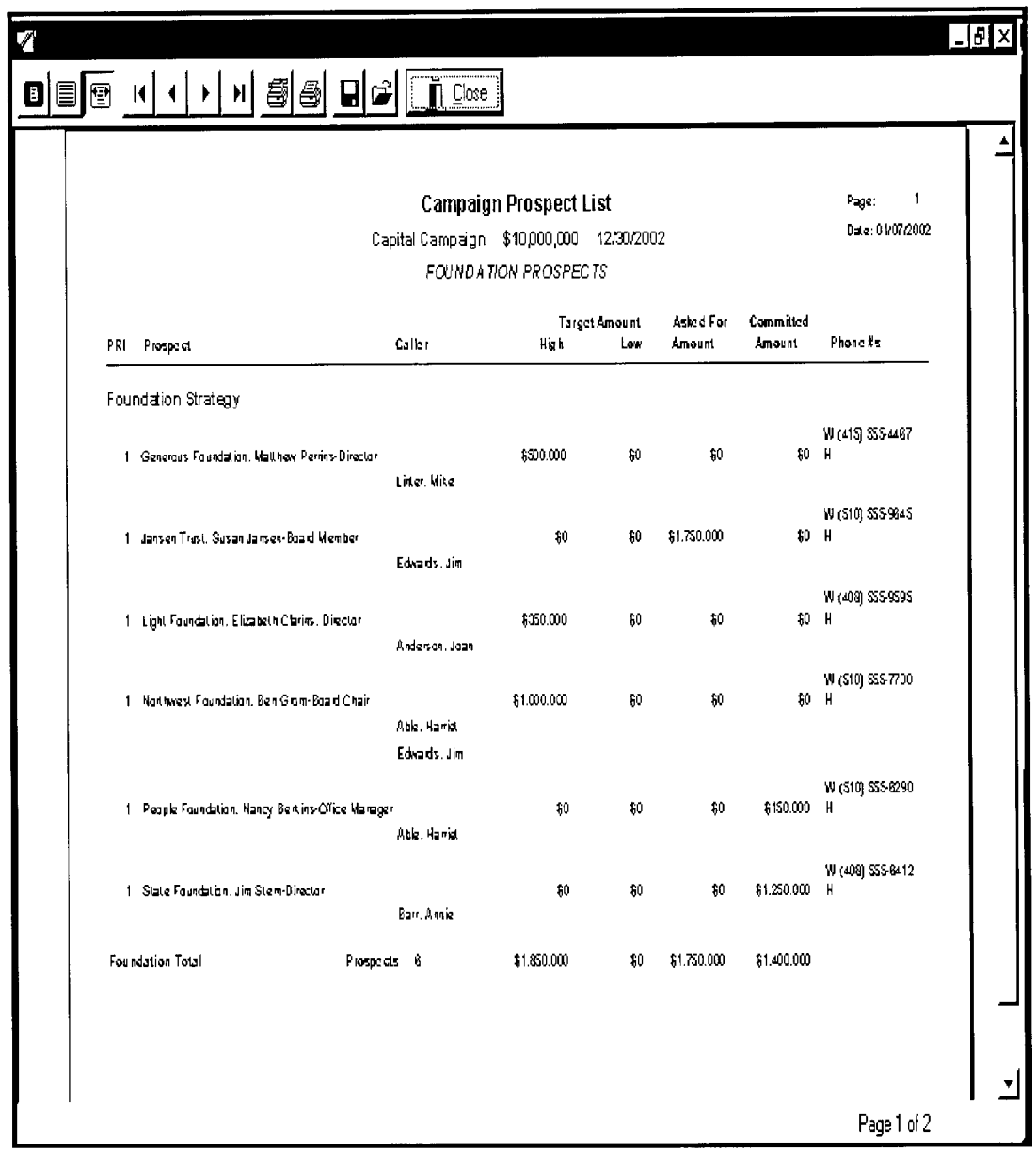
Figure 14C:
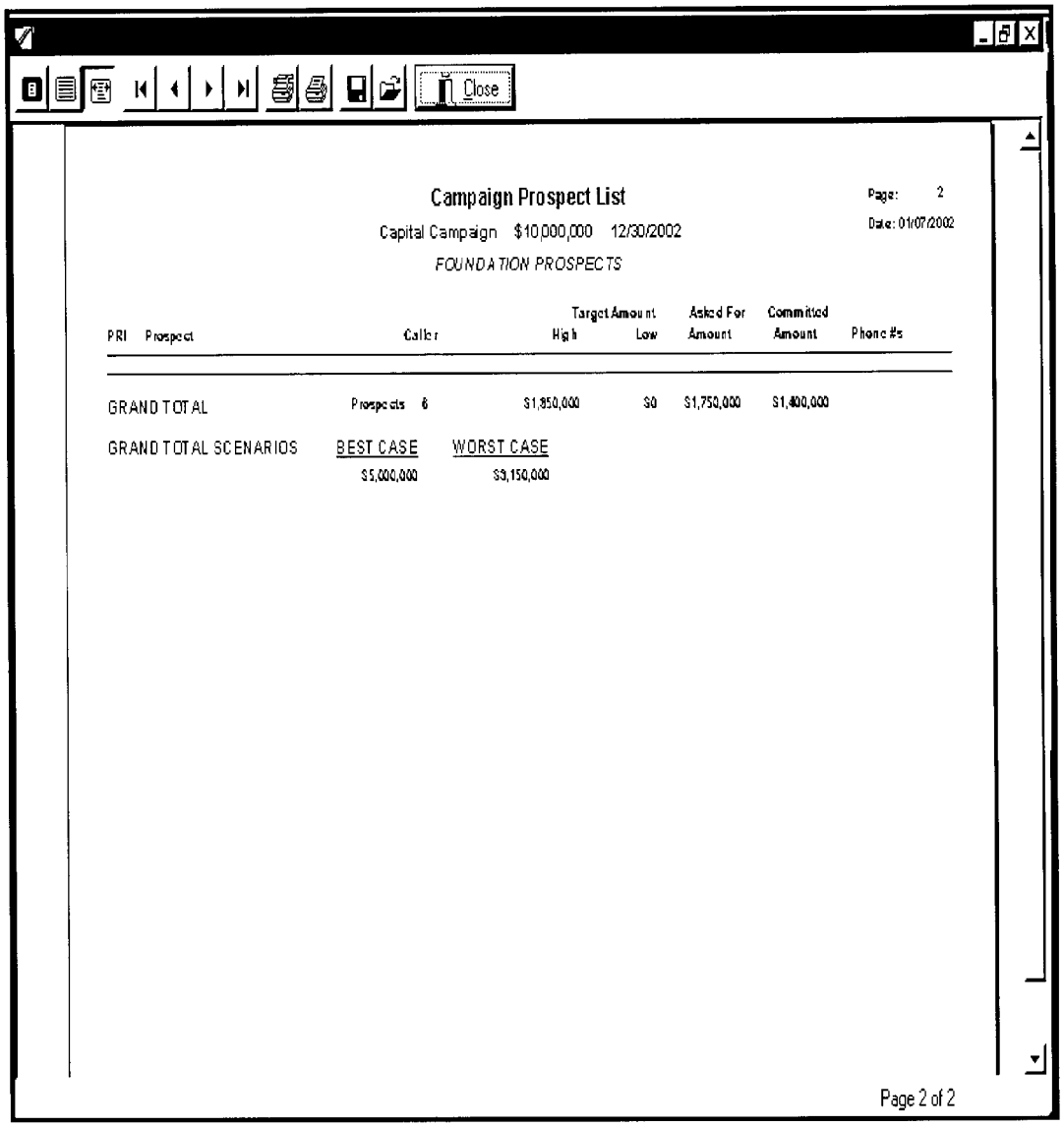
Figure 15A:
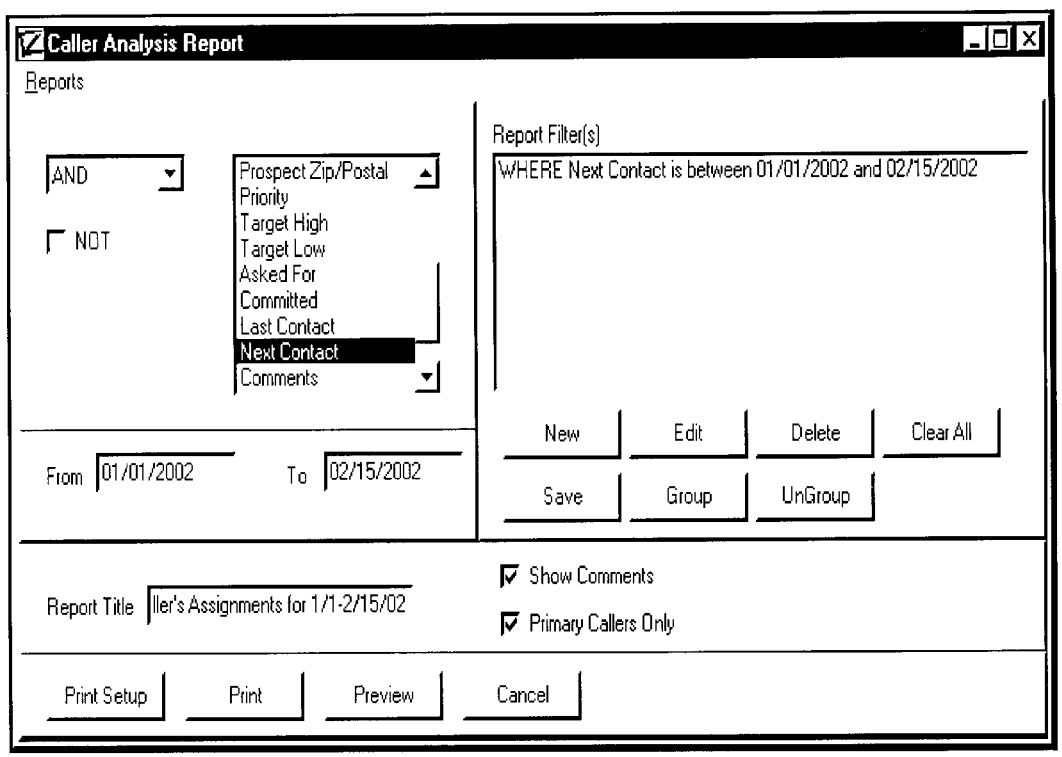
Figure 15D:
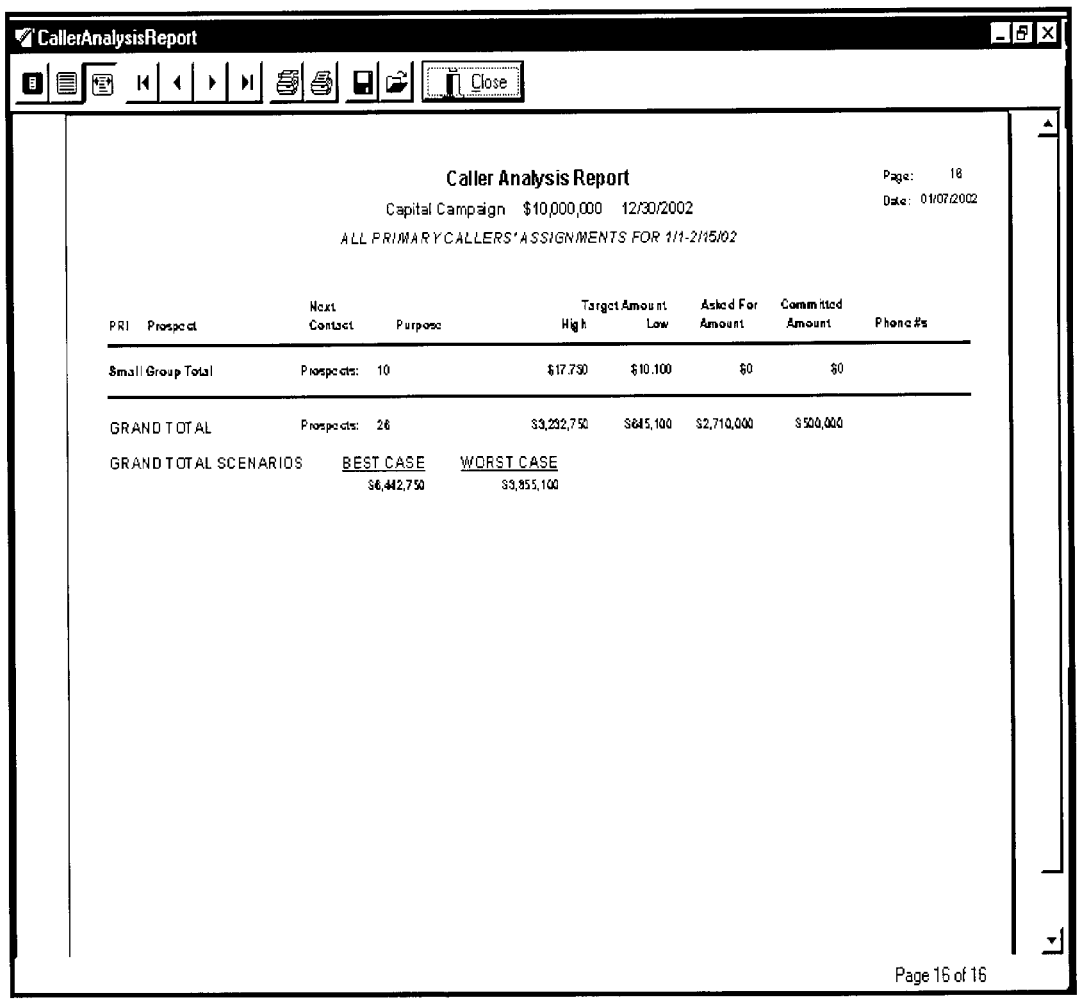

This report is a road map without much "scenery", i.e., it has just the basics of prospect and caller names and financials. It's designed to focus on a particular issue, e.g., major donors, alumni, foundations, etc., and these factors can be combined with each others and with dates, particular callers, etc. FIGS. 14A–C illustrate an Campaign Prospect List status report selection graphical interface and an example screen display of a resultant report according to specific embodiments of the present invention.

3.4. Caller Analysis Report

This report is a road map for each caller. Based on the criteria selected, it will report on each caller based on a given time period—say a month, a given financial level—say $25,000 and above, a given geographical area—say the Northeast, or any number of other factors or any combination of factors. This is the key report to send frequently to callers to hold them accountable and to use in phone calls and meetings when reviewing the campaign and work of callers. FIGS. 15A–D illustrate a Caller Analysis report selection graphical interface and an example screen display of a resultant report according to specific embodiments of the present invention.

3.5. Prospect Review Report

Figure 16A:
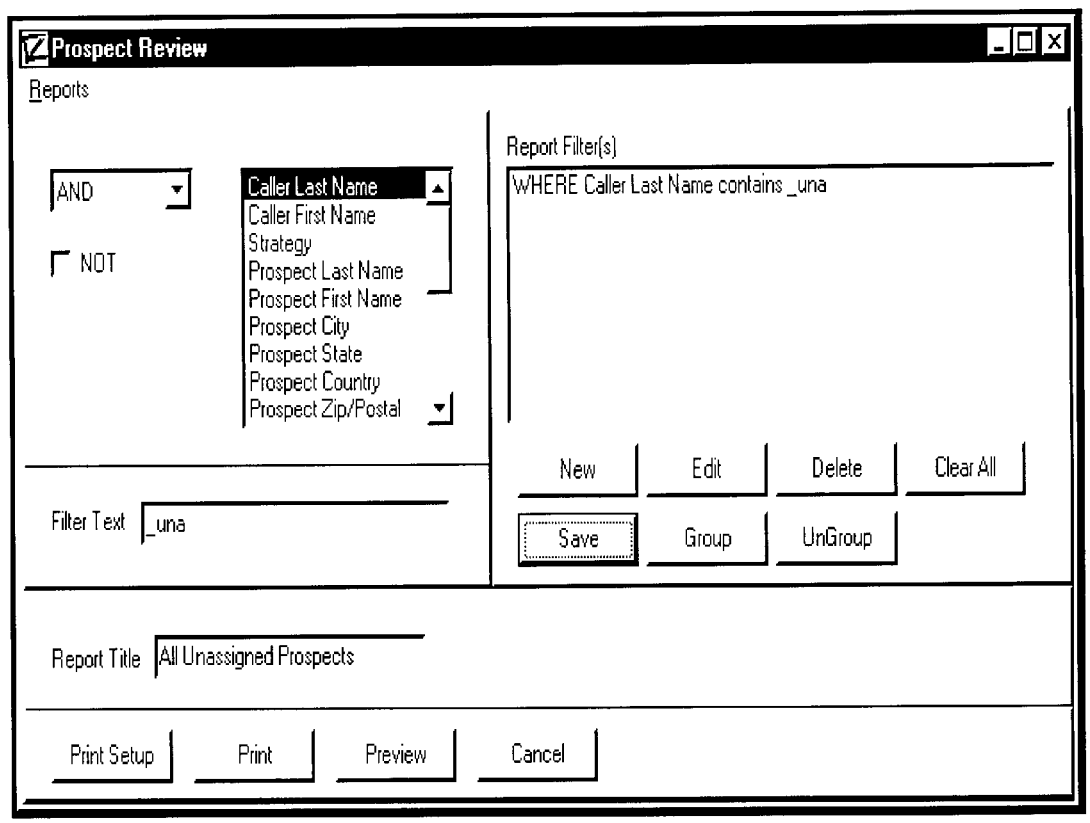
FIGS. 16A–B illustrate a Prospect Review report selection graphical interface and an example screen display of a resultant report according to specific embodiments of the present invention.
Figure 16B:
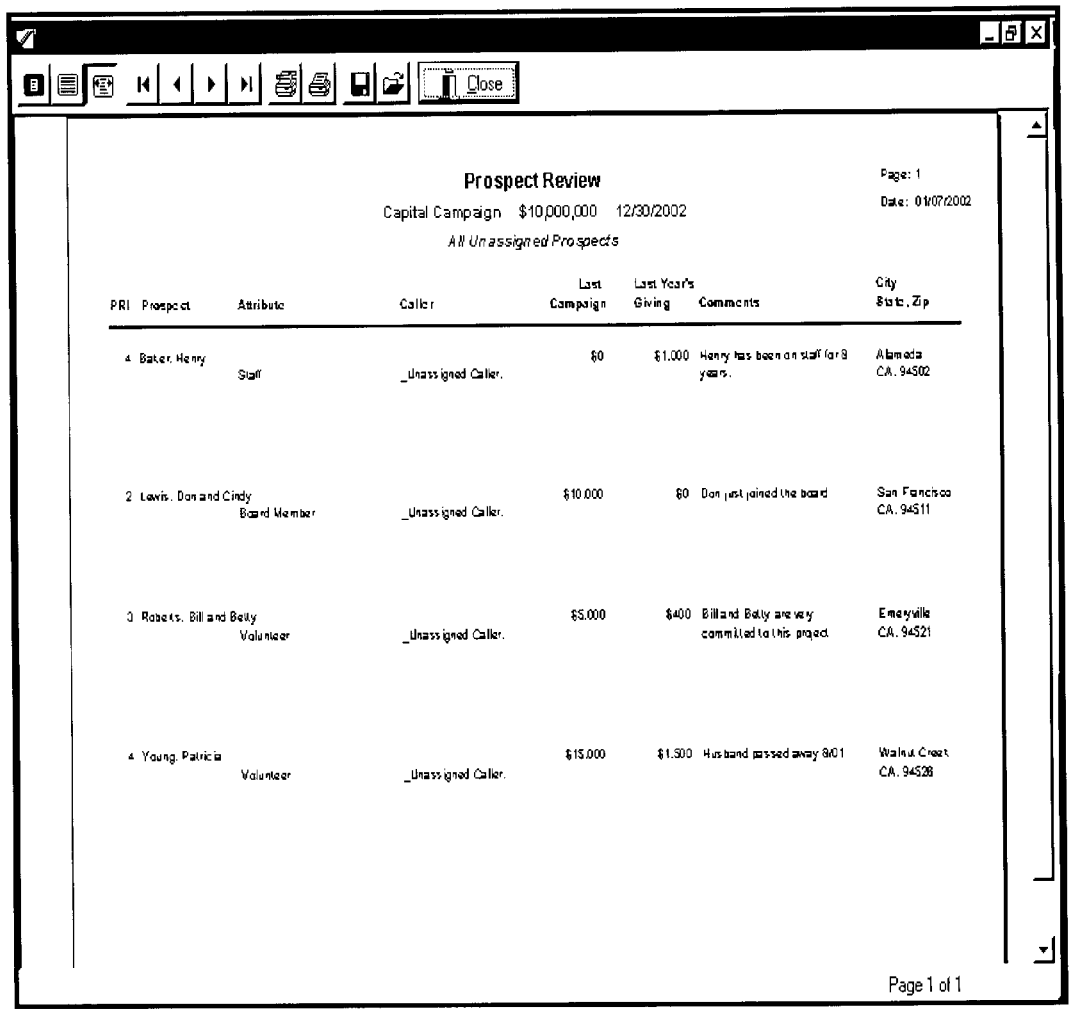

This report is pre-trip road map. This report is designed to review potential prospects for a campaign and includes last year's and last campaign's giving. This report provides the basis for projecting what they might be asked to consider in the current campaign. FIGS. 16A–B illustrate a Prospect Review report selection graphical interface and an example screen display of a resultant report according to specific embodiments of the present invention.

3.6. Contact History Report

Figure 17A:
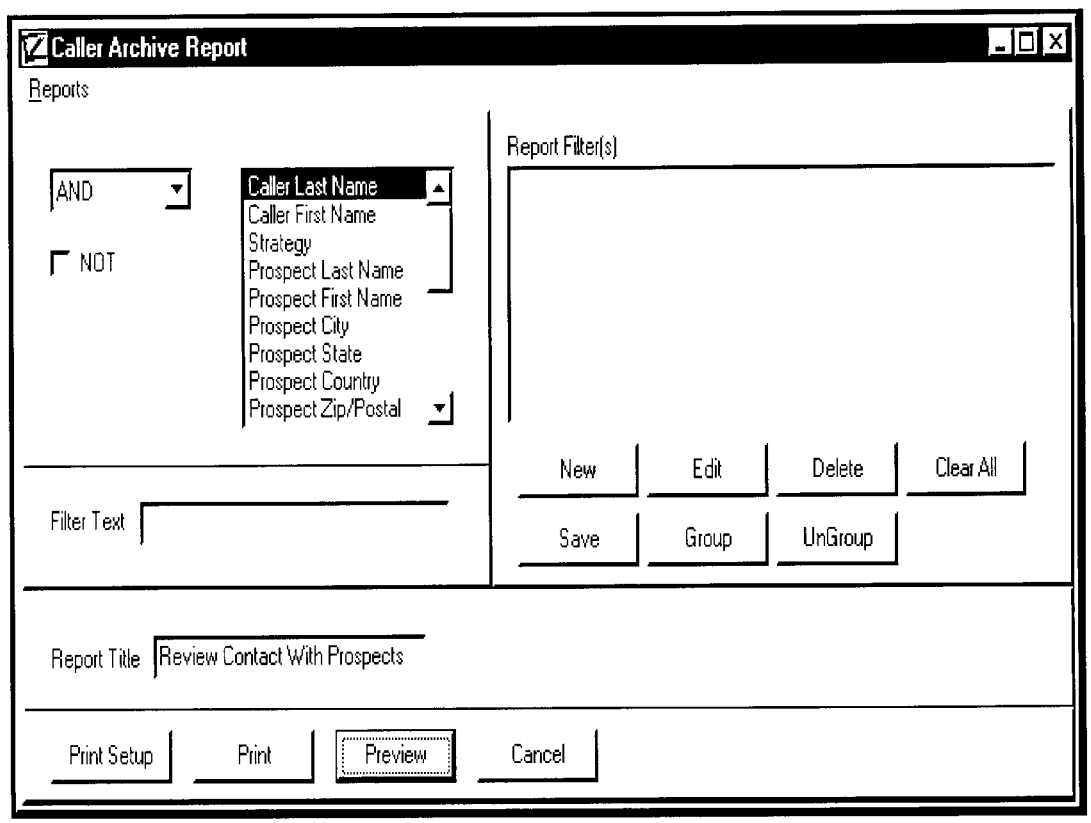

This report is a "rear view mirror". It lists all the contacts with a prospect that have been archived by the user and it is used in planning the next steps. FIGS. 17A–C illustrate an Caller Archive status report selection graphical interface and an example screen display of a resultant report according to specific embodiments of the present invention.

3.7. Campaign/Project Comparison Report

Figure 18A:
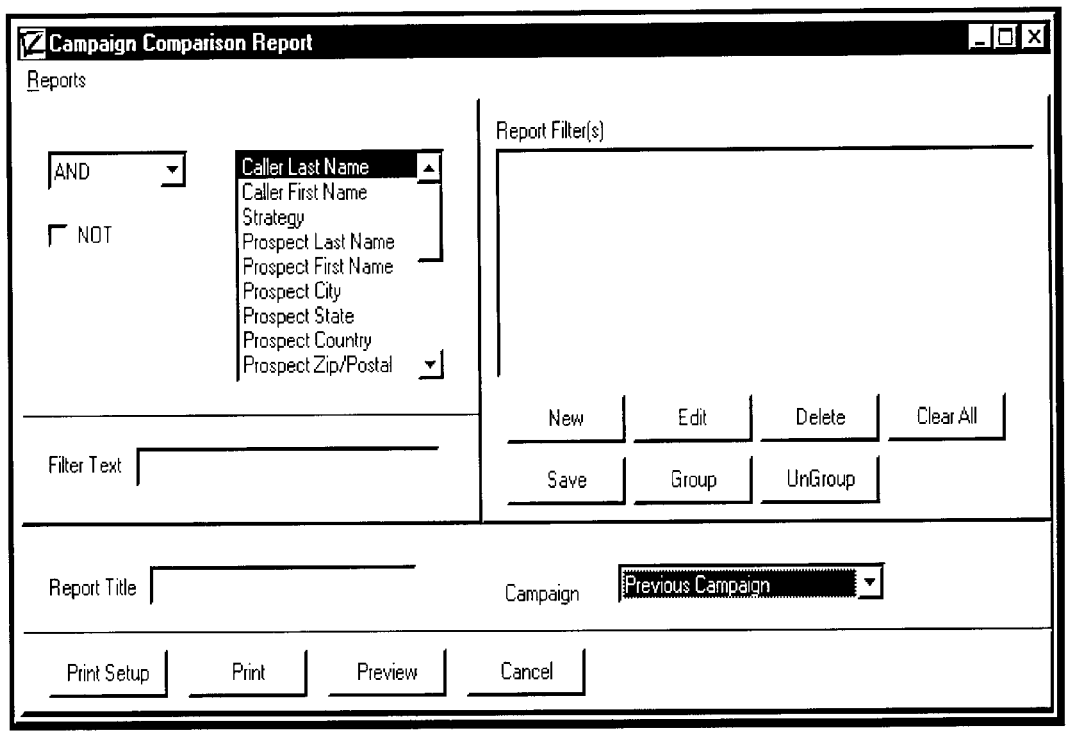
FIGS. 18A–B illustrate a Campaign Comparison report selection graphical interface and an example screen display of a resultant report according to specific embodiments of the present invention.
Figure 18B:
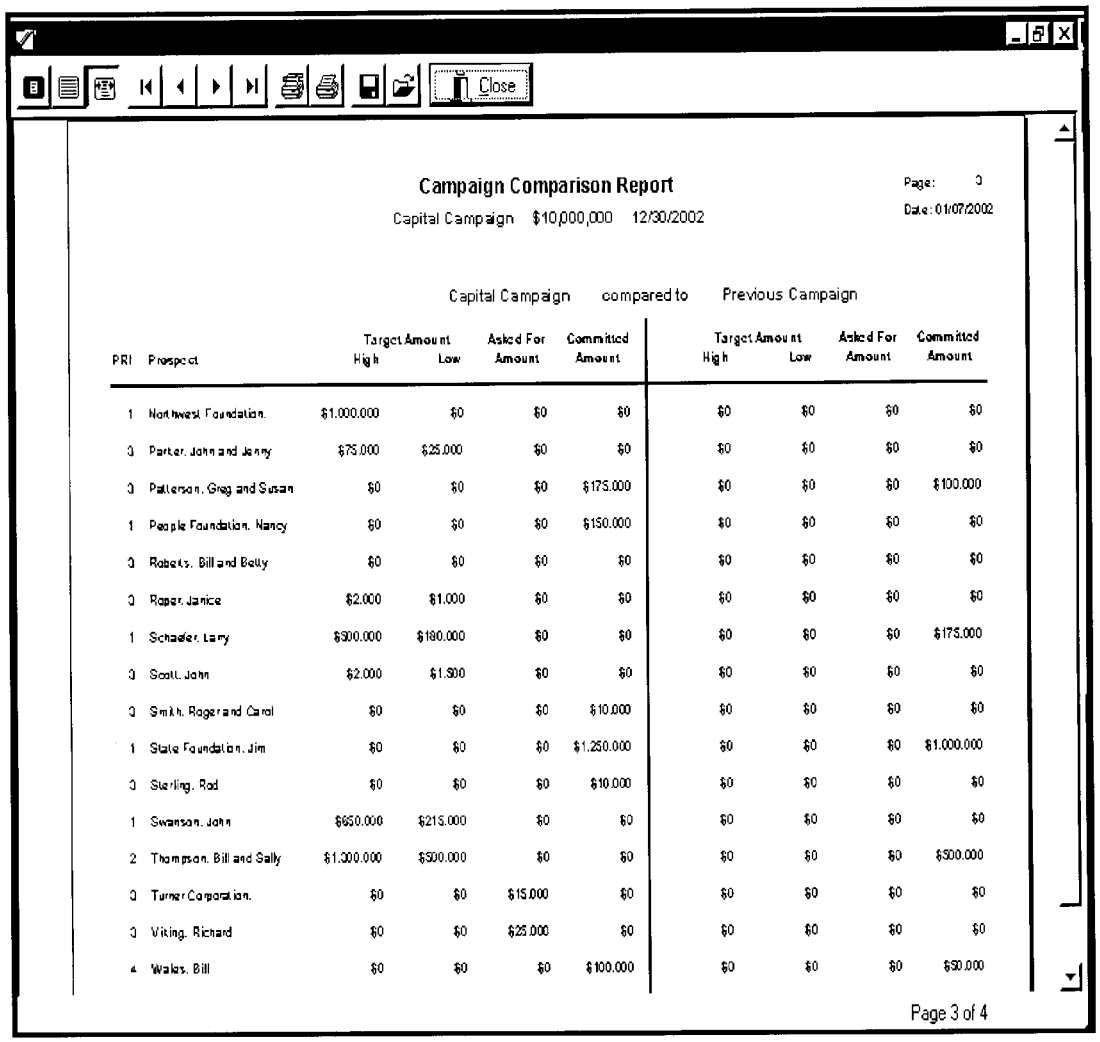

This report provides the opportunity to compare 2 or more campaigns or projects. This can be helpful in analyzing the strengths and weaknesses of different campaigns and make sure you learn from history, not repeat it. FIGS. 18A–B illustrate a Campaign Comparison report selection graphical interface and an example screen display of a resultant report according to specific embodiments of the present invention.

3.8. Report Filtering

The figures also illustrate methods for specifying and selecting filters for report generation. As will be understood from the figures, report filters may be specified by selecting a field identifier from a window (scrollable when necessary.) Once a field identifier is selected, range or value input prompts are displayed that are appropriate to that field. Group and ungrouping buttons can be used to indicating parenthetical expressions and a drop down list is provided for indicating operators (such as AND, OR, XOR, >,<, EQUALS, etc.). In specific embodiments, a report filter display window shows a textual display of a filter as it is being selected or edited. Further details of constructing filters according to specific embodiments will be understood from the figures.

3.9. Further Report Features

In further embodiments, report generation in a capital campaign management system includes additional features to increase report usability.

According to specific embodiments of the present invention, for example, reports may be formatted so that a page breaks either before or after a prospect, but does not split up data for one prospect. In further embodiments, a mail merge option is provided to communicate merge data with Microsoft Word or other applications. A user is able to choose a printing or display order of strategies, in a Strategy Maintenance interface through use of the arrow indicators as shown in FIG. 9, which gives greater flexibility. In further embodiments, reports can include a Best and Worst Case (or HIGH and LOW target amounts) data and columns indicating Best and Worst Case expectations for a prospect.

In further embodiments, report filters provide a range capability for a zip code field or/and for priority filters. Filtering is also allowed for Attributes and allowed to on priority "unassigned." Separate filtering is allowed in Caller Analysis Reporting for an assigned primary caller.

In a further embodiment, according to specific embodiments of the present invention, a prospect associated with a campaign has to be associated with one, and only one strategies. Strategies can be user defined and can include such things as foundation, alumni, mid-Atlantic alumni, etc.

4. High-level Class Diagram

The present invention can be further illustrated understood in terms of a particular data model. This data model will be understood from the discussion above and the further details below.

Figure 20:
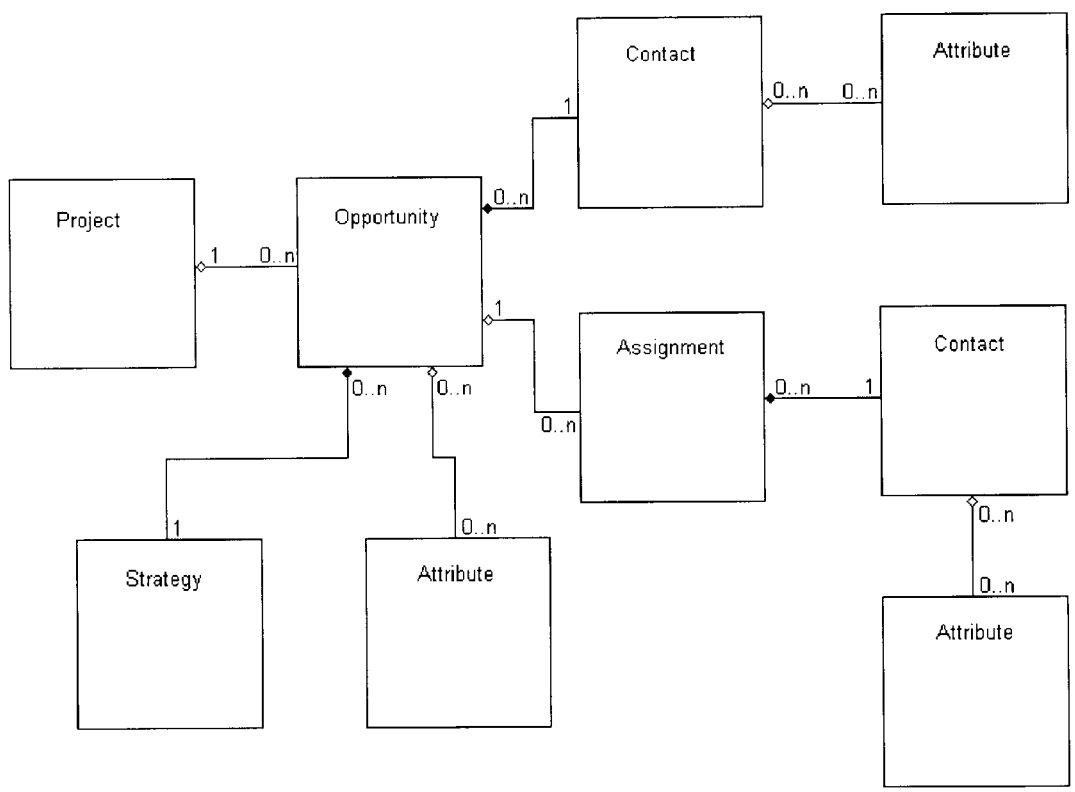
FIG. 20 is a diagram that illustrates as an example the major object relationships of an example data structure according to specific embodiments of the present invention.

FIG. 20 is a diagram that illustrates as an example the major object relationships of an example data structure specific embodiments of the present invention. The Project object describes the current campaign. The Contact object contains the identity of the people/entities involved with the organization as Prospects and/or Callers. A Prospect is an entity that is a potential donor. Any number of Opportunity objects can be related to the Project object. The Opportunity object associates a Contact with the Project object as a Prospect. The Assignment object associates Contact objects with the Opportunity object as Callers to the Prospect. Each Opportunity is also assigned to a Strategy. The association of Attribute objects to Contact and Opportunity allows entities to have permanent attributes as well as attributes in the context of a project/campaign.

5. Example Data Structure

Figure 21:
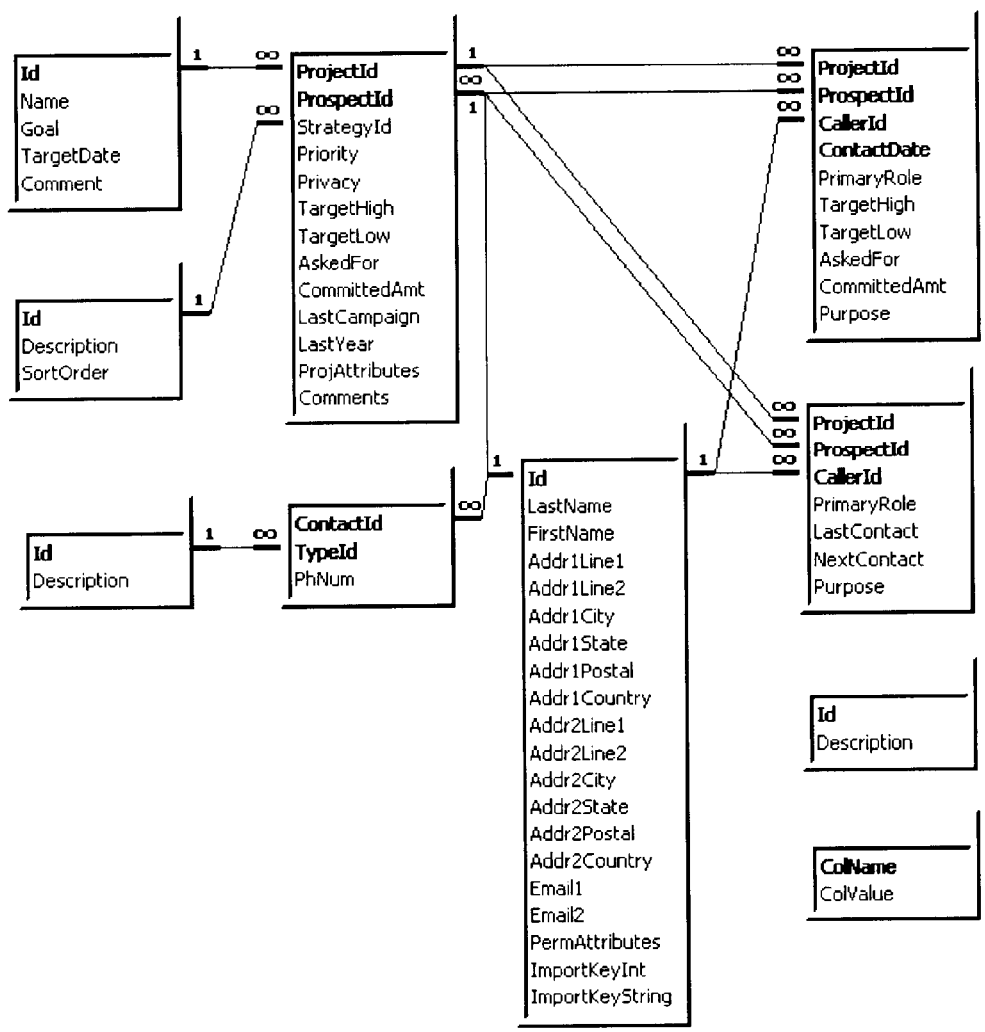
FIG. 21 is a diagram of an example data structure specific embodiments of the present invention.

FIG. 21 is a diagram of an example data structure specific embodiments of the present invention. The data objects as listed below are illustrated in this example.

5.1. Contact

Contains personal data (e.g. Name, address, email) for all people/entities used in a campaign. Contacts can be Prospects, Callers, or both.

5.2. Project

Describes the high-level information for a Campaign, e.g. Name, Goal, and Target Date.

5.3. Strategy

The table contains different strategies that may be selected to classify the type of prospect. (E.g. Major donor, auction, small group).

5.4. PhoneType

Lookup table for types of phone numbers. (E.g. Home, Work, Fax, and Cellular)

5.5. Opportunity

This table contains the prospects. The prospect is tied to a specific campaign. It has fields for a Campaign and a Contact, and also for monetary estimates of the campaign donation.

5.6. ContactPhone

Contains phone numbers for contacts stored in the Contact table.

5.7. Assignment

Contains Caller assignments for Prospects. A Prospect can have many Callers, but only one Caller can be the Primary Caller.

5.8. MeetingArchive

Contains a history of meetings between a Prospect and the Callers who work with him/her.

5.9. Attribute

Lookup table for attributes. Attributes are used to help categorize or contacts. Note that in particular embodiments, each contact in the contact database can be associated with one ore more "permanent attributes" which are attributes associated with a contact, independent of any campaign. Attributes also can be associated with a particular prospect in a particular campaign, for example using the projAttributes field. Attributes generally are such things as as alumni, student, faculty, foundation, etc., but according to specific embodiments of the invention, can be user defined using any identifying string.

5.10. WindShield

Stores name-value pairs for application settings, currently stores database revision number, Unassigned Caller Id, and Last Project.

In particular embodiments, this data structure is associated with the following relationships:

| | | |
|---|---|---|
| Project.Id | (1..n) | Opportunity.ProjectId |
| Strategy.Id | (1..n) | Opportunity.StrategyId |
| *Opportunity.ProjectId | (1..n) | MeetingArchive.ProjectId AND |
| *OpportunityProspectId | (1..n) | MeetingArchive.ProspectId |
| *Opportunity.ProjectId | (1..n) | Assignment.ProjectId AND |
| *Opportunity.ProspectId | (1..n) | Assignment.ProspectId |
| PhoneType.Id | (1..n) | ContactPhone.TypeId |
| Contact.Id | (1..n) | Opportunity.ProspectId |
| *Contact.Id | (1..n) | ContactPhone.ContactId |
| Contact.Id | (1..n) | MeetingArchive.CallerId |
| Contact.Id | (1..n) | Assignment.CallerId |

*Cascading Deletes

This illustration is present as an example, and other data organization paradigms will be understood from the teachings herein.

6. Methods

Figure 22:
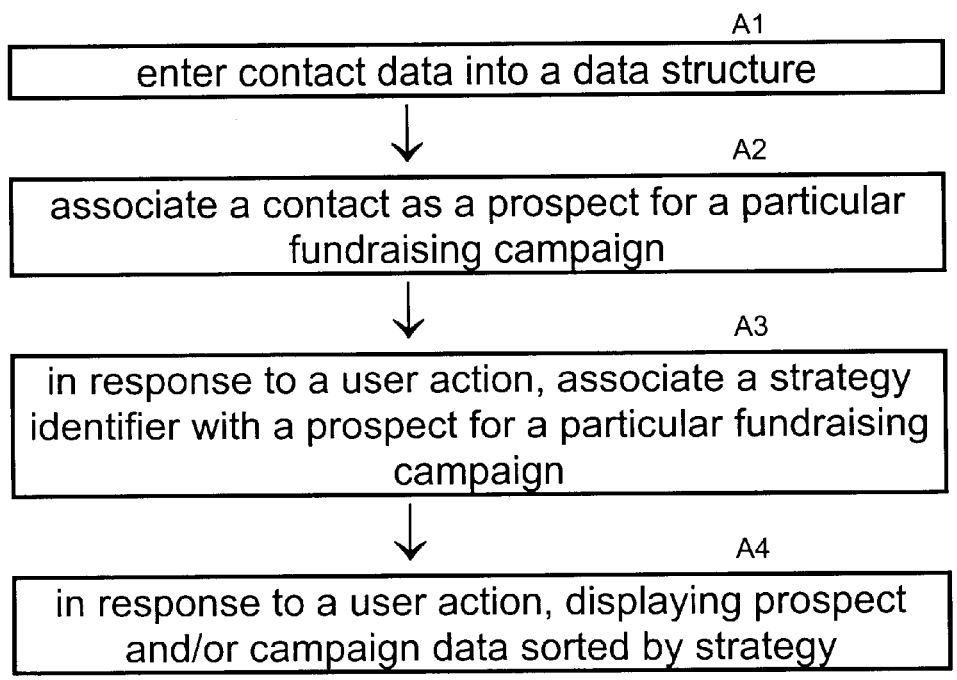
FIG. 22 is a flowchart of an example method for associating a prospect with a campaign and campaign strategy according to specific embodiments of the present invention.
Figure 23:
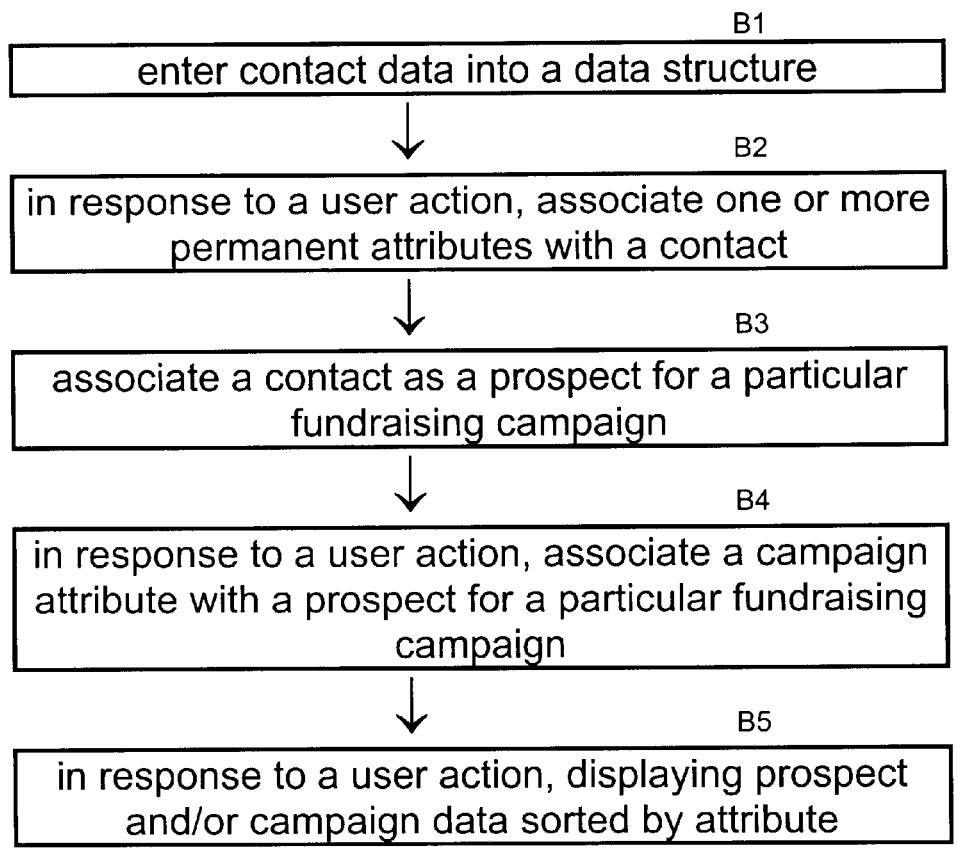
FIG. 23 is a flowchart of an example method for associating a prospect with permanent attributes and campaign attributes according to specific embodiments of the present invention.

As will be understood from the teachings herein, the present invention involves a number of innovative methods for performing different aspects of a fundraising campaign. FIG. 22 is a flowchart of an example method for associating a prospect with a campaign and campaign strategy according to specific embodiments of the present invention. FIG. 23 is a flowchart of an example method for associating a prospect with permanent attributes and campaign attributes according to specific embodiments of the present invention. Other methods of the invention will be understood from the teachings herein.

7. Other Features

As a further feature, a new prospect added to a database for a campaign is automatically assigned to a special field (such as "-Unassigned Caller") as their primary caller. This assignment allows a user to print reports, using the special field as a filter to find prospects without callers. This also guarantees that prospect will be counted in Summary Production Report, which only includes prospects who have primary callers and also allows prospects to show up in other reports that list prospects by primary caller. In further embodiments, this caller assignment is automatically unassigned when a actual caller is assigned to a prospect and as a further option the new caller (or the first assigned caller) can be automatically assigned as the primary caller.

According to further embodiments of the present invention, a campaign maintenance screens allows user to delete campaign without deleting all prospects one by one before deleting the campaign.

8. System

8.1. Overall System

The present invention is preferably implemented as a computer program running on an information appliance, such as a computer, or on several computers using a network. In one embodiment, a network may include connections via the Internet, a Local Area Network, subscriber networks. etc. Among other possible user interfaces, the invention may be embodied in a system of GUIs. General methods for construction and operation of such systems is well known in the art, and the present invention can be understood as operating in a way roughly similar to other systems used in similar environments, except as specified herein.

8.2. Embodiment in a Programmed Digital Apparatus

The invention may be embodied in a fixed media or transmissible program component containing logic instructions and/or data that when loaded into an appropriately configured computing device cause that device to perform in accordance with the invention.

As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

Figure 24:
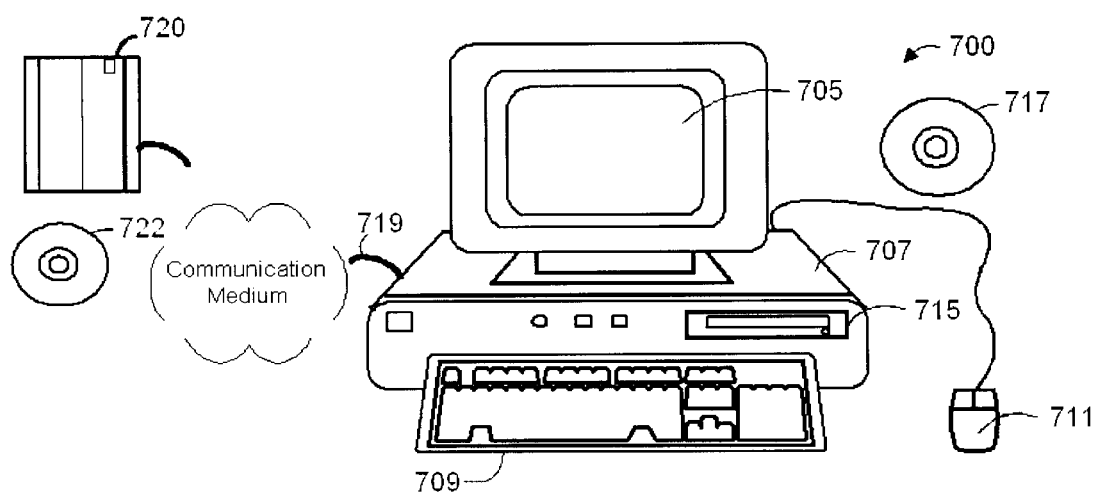
FIG. 24 illustrates a representative example logic device in which various aspects of the present invention may be embodied or that can be used to provide interface to a system according to the invention.

FIG. 24 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language that may be used to create an ASIC or PLD that operates as herein described.

9. Other Embodiments

The invention has now been described with reference to specific embodiments. Other embodiments will be apparent to those of skill in the art. In particular, a user digital information appliance has generally been illustrated or described as a personal computer. However, the digital computing device is meant to be any device for handling information could include such devices as a digitally enabled television, cell phone, personal digital assistant, etc.

Furthermore, while the invention has in some instances been described in terms of client/server application environments, this is not intended to limit the invention to only those logic environments described as client/server. As used herein, "client" is intended to be understood broadly to comprise any logic used to access data from a separable system and "server" is intended to be understood broadly to comprise any logic used to provide data to a separable system.

It is understood that the examples and embodiments described herein are for illustrative purposes only and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

10. Appendix

This application is being filed with an appendix of 27 total pages comprising a user's manual of a campaign tracking system according to specific embodiments of the present invention.

What is claimed is:

1. A method of managing a fundraising campaign comprising:

under control of a computer system:

displaying a graphical user interface for a particular fundraising campaign including an indication of a prospect of said particular fundraising campaign; and in response to a user action, associating a strategy identifier with said prospect; storing data indicating said prospect and said associated strategy identifier for said campaign; and in response to a reporting request, presenting campaign status information summarized or; sorted by strategy identifier; further wherein displaying a graphical user interface includes displaying a target high amount, a target low amount, an asked for amount, and a committed amount for a particular prospect for a particular campaign.

2. The method of claim 1 wherein displaying a graphical user interface includes displaying a drop down list indicator allowing selection of a strategy.

3. The method of claim 1 further comprising, displaying in said graphical user interface indications for two or more contacts for a prospect for a particular fundraising campaign including an indication of a primary contact.

4. The method of claim 1 further comprising:

displaying a list of attributes for a prospect;

in response to selection of an attribute activation item, displaying a list of available attributes;

in response to a user action, associating an available attribute with a prospect;

storing data indicating said prospect and said associated attribute identifier for said campaign; and in response to a reporting request, presenting campaign status information summarized or sorted by attribute identifier.

5. The method of claim 4 further wherein an attribute can be associated with a prospect as a campaign attribute or as a permanent attribute.

6. The method of claim 1 further comprising:

in response to a user request, displaying a campaign summary including a best case scenario amount and a worst case scenario amount.

7. The method of claim 6 wherein said best case scenario amount and said worst case scenario amount are calculated from data stored and associated with a plurality of prospects associated with a campaign.

8. An electronic data file, recorded or transmitted on a digital medium, that when loaded into an appropriately configured digital apparatus causes the apparatus to embody the system of claim 1.

9. The method of claim 1 further comprising:

when a prospect is associated with a campaign, providing a privacy indication for said prospect that when selected prevents a prospect's financial information from being presented in any report for this campaign.

10. The method of claim 1 further wherein one or more prospects may be added to a campaign by copying said one or more prospects from a different campaign.

11. The method of claim 1 further wherein when a prospect is initially associated with a campaign, automatically associating a default strategy indication with said initially associated prospect and wherein said default strategy indication can be later changed by a user action.

12. A method of managing a fundraising campaign comprising:

under control of a computer system:

displaying a graphical user interface for a particular fundraising campaign including an indication of a prospect of said particular fundraising campaign; and in response to a user action, associating a strategy identifier with said prospect;

storing data indicating said prospect and said associated strategy identifier for said campaign;

in response to a reporting request presenting campaign status information summarized or sorted by strategy identifier;

in response to a user selection, opening a field of said target high amount, target low amount, asked for amount, or committed amount in said graphical interface allowing a user to input an amount; and storing data indicating said newly input amount.

13. A method of managing a campaign using a computing system comprising:

using a prospect contact graphical user interface to enter prospect data that does not vary with a campaign;

using a caller contact graphical user interface to associate one or more callers with a prospect for a particular campaign and storing within a record multiple contacts related to a prospect and a role indication for each of the contacts;

using a prospect contact graphical user interface to display and enter permanent attribute data;

using a campaign graphical user interface to display and enter campaign dependent attributes for a prospect;

using a campaign graphical user interface to display and enter a campaign strategy appropriate for a prospect;

using a campaign graphical user interface to display and enter a solicitation stage for a prospect;

using a campaign graphical user interface to display and enter solicitation stage amounts for a prospect;

using a report selection graphical user interface to select from a plurality of available reports, a report for presenting data for determining how callers are performing with regard to a campaign; and using a campaign graphical user interface to display and enter caller archive data for a prospect in relation to a campaign.

14. The method according to claim 13 wherein said solicitation stage comprises one of (a) targeted (b) asked, (c) committed, or (d) pledged.

15. The method according to claim 13 wherein attributes comprise one or more of: individuals, committee members, leaders, foundations, churches, volunteers.

16. The method according to claim 13 wherein a prospect can be associated with an unassigned caller designation as a caller.

17. The method according to claim 13 a prospect can be associated with an unassigned caller designation as a caller and wherein a newly entered prospect in a campaign is automatically associated with an unassigned caller designation and wherein a user can output reports using an "unassigned caller" designation as a filter to find prospects without callers and wherein having the unassigned caller given to a new prospect automatically as primary caller, guarantees the prospect will appear in reports that only print prospects in groups under a primary caller.

18. The method according to claim 13 wherein every prospect, regardless of giving potential, can be captured in a campaign and matched with a strategy that fits the prospect;

wherein prospects identified as having a potential to give a major gift is assigned a caller and assigned an individual solicitation strategy; and wherein prospects not identified as having a potential to give a major gift are associated with a group strategy.

19. A method according to claim 13 further comprising using a graphical user interface to select a one or more reports comprising:

summary production report;

caller analysis report;

status report;

project prospect list report;

prospect review report;

contact history/caller archive report; and project comparison report.

20. The method of claim 13 further wherein said using a campaign graphical user interface to display and enter caller archive data automatically enters caller archive data upon selection of an archive indication.

21. The method of claim 13 further comprising:

using a duplicate prospects graphical user interface to duplicate one or more prospects from a source campaign to a target campaign.

22. A data handling information system with a prospect-centered data structure and one or more graphical user interfaces for managing fundraising campaigns comprising:

for a prospect, a plurality of prospect name/address fields for storing basic prospect name, address, and other personal data;

for a prospect, a permanent attributes field for holding one or more permanent attributes for a prospect;

for a prospect, for a particular campaign:

caller associations for linking one or more callers with a prospect;

a strategy field for associating a strategy with a prospect;

a target high field for holding a target high giving amount for a prospect;

a target low field for holding a target low giving amount for a prospect;

an asked for field for holding an asked for amount for a prospect: and a committed amount field for holding an amount committed by a prospect;

a data storage system;

an input device for inputting data using a graphical user interface; and a central processing unit.

23. The system according to claim 22 further comprising for a prospect, for a particular campaign:

a priority code field for associating a priority code with a prospect; and a primary field for identifying a primary caller for a prospect.

24. The system according to claim 22 further comprising for a prospect, for a particular campaign:

a next contact date field for holding a next contact date for a prospect; and a last contact date field for holding a previous contact date for a prospect.

25. The system according to claim 22 further comprising for a prospect, for a particular campaign:

an attributes field for holding a one or more campaign related attributes for a prospect; and a plurality of caller archive fields; each indicating a contact date, caller, asked for amount, committed amount, and purpose.

26. The system according to claim 22 further wherein said data handling information system can comprise multiple campaigns and wherein a prospect can be associated with more than one campaign.

27. The system according to claim 22 further comprising:

a duplicate prospects graphical user interface allowing one or more prospects to be copied from a source campaign to a target campaign.

* * * * *